United States Patent
Hayduke et al.

[11] Patent Number: 6,133,531
[45] Date of Patent: Oct. 17, 2000

[54] WEATHERPROOF OUTLET COVER

[75] Inventors: Nicholas P. Hayduke, Marcellus; Andrea Burke, Palmyra, both of N.Y.

[73] Assignee: Pass & Seymour, Inc., Syracuse, N.Y.

[21] Appl. No.: 09/185,442

[22] Filed: Nov. 3, 1998

[51] Int. Cl.[7] .................................................. H02G 3/14
[52] U.S. Cl. ........................... 174/67; 220/241; 220/242; 439/139; 439/165
[58] Field of Search ................................. 174/67, 66, 57, 174/58; 220/242, 241, 4.24, 4.22, 4.23, 839, 3.8; 439/139, 11, 31, 165, 373, 144, 142, 361

[56] References Cited

U.S. PATENT DOCUMENTS

| | | | |
|---|---|---|---|
| 4,381,063 | 4/1983 | Leong | 220/242 |
| 4,979,634 | 12/1990 | Begley | 220/242 |
| 5,243,135 | 9/1993 | Shotey | 174/67 |
| 5,245,507 | 9/1993 | Erickson | 361/641 |
| 5,527,993 | 6/1996 | Shotey et al. | 174/67 |

*Primary Examiner*—Kristine Kincaid
*Assistant Examiner*—Dhiru R Patel
*Attorney, Agent, or Firm*—Harter, Secrest & Emery LLP

[57] ABSTRACT

A weatherproof outlet cover assembly for protecting an outdoors electrical outlet is disclosed. The cover includes a housing which is hinged at one corner so that the cover can be used for either a horizontally or vertically oriented electrical receptacle. With the corner hinge, the cover closes due to gravity in either position, thus ensuring that the cover will always remain closed unless it is purposely held open. The hinge preferably includes a baffle which directs water down and away from the mating surfaces of the housing and back body. The back body may have a recessed and key shaped opening so that existing screws in a receptacle need only be backed partially out, rather than being completely removed. A wall plate may be snapped into place within the back body using a unique tab and tooth rack combination. To keep the housing closed relative to the back body, a snap may be actuated in the closed position, and a pair of aligned lock holes allows for a combination or key lock to prevent unauthorized access to the hidden receptacle. Cords of plugs inserted into the outlets may exit through an opening at a corner opposite the corner where the hinge is located. Thus, the exit opening faces in a generally downward direction whether the cover is placed horizontally or vertically. A pair of rubber flaps prevents rain water from back-splashing into the enclosure.

42 Claims, 21 Drawing Sheets

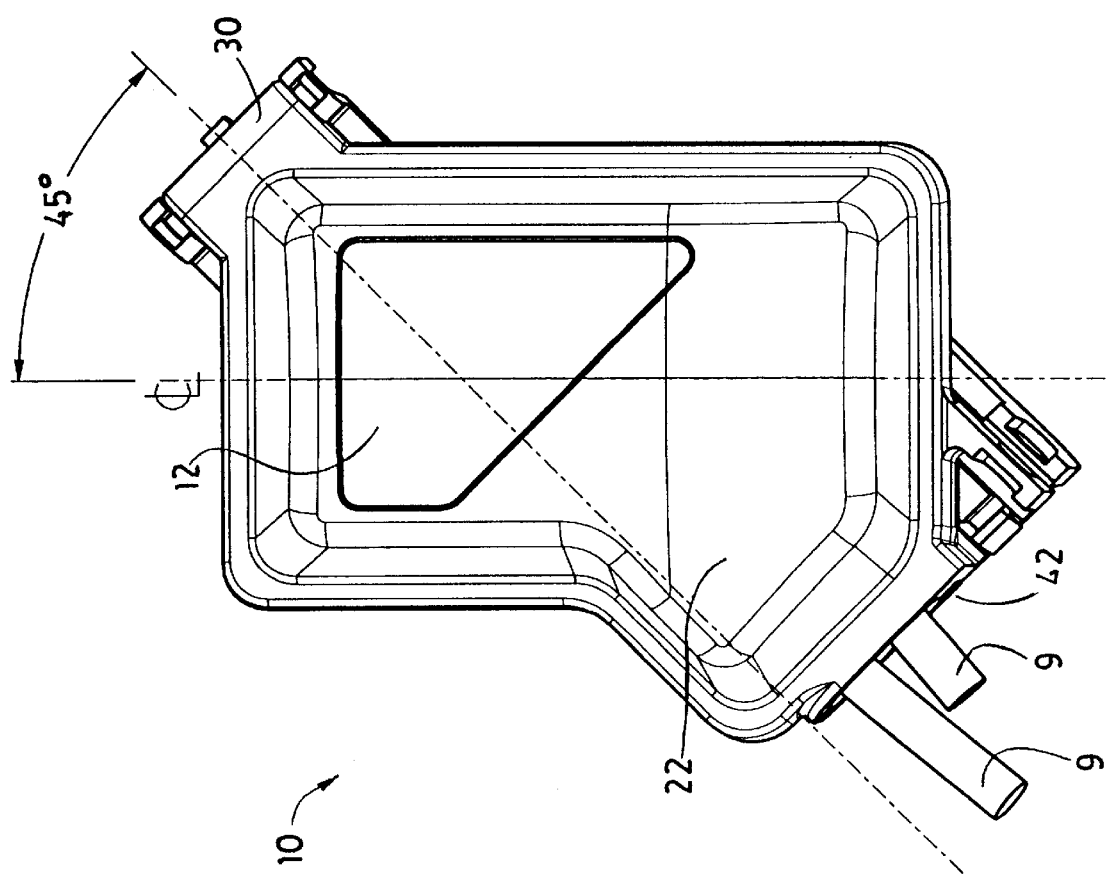

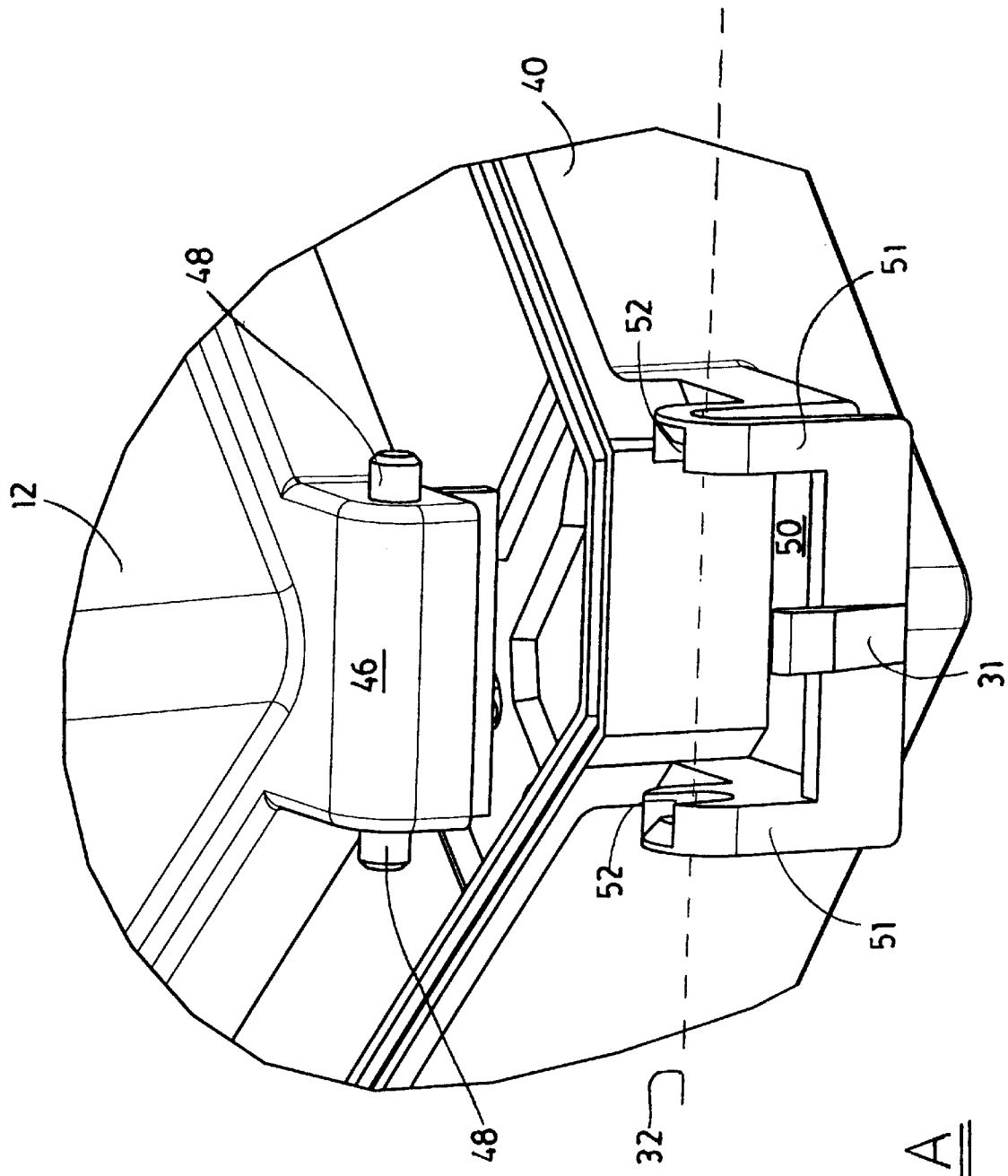

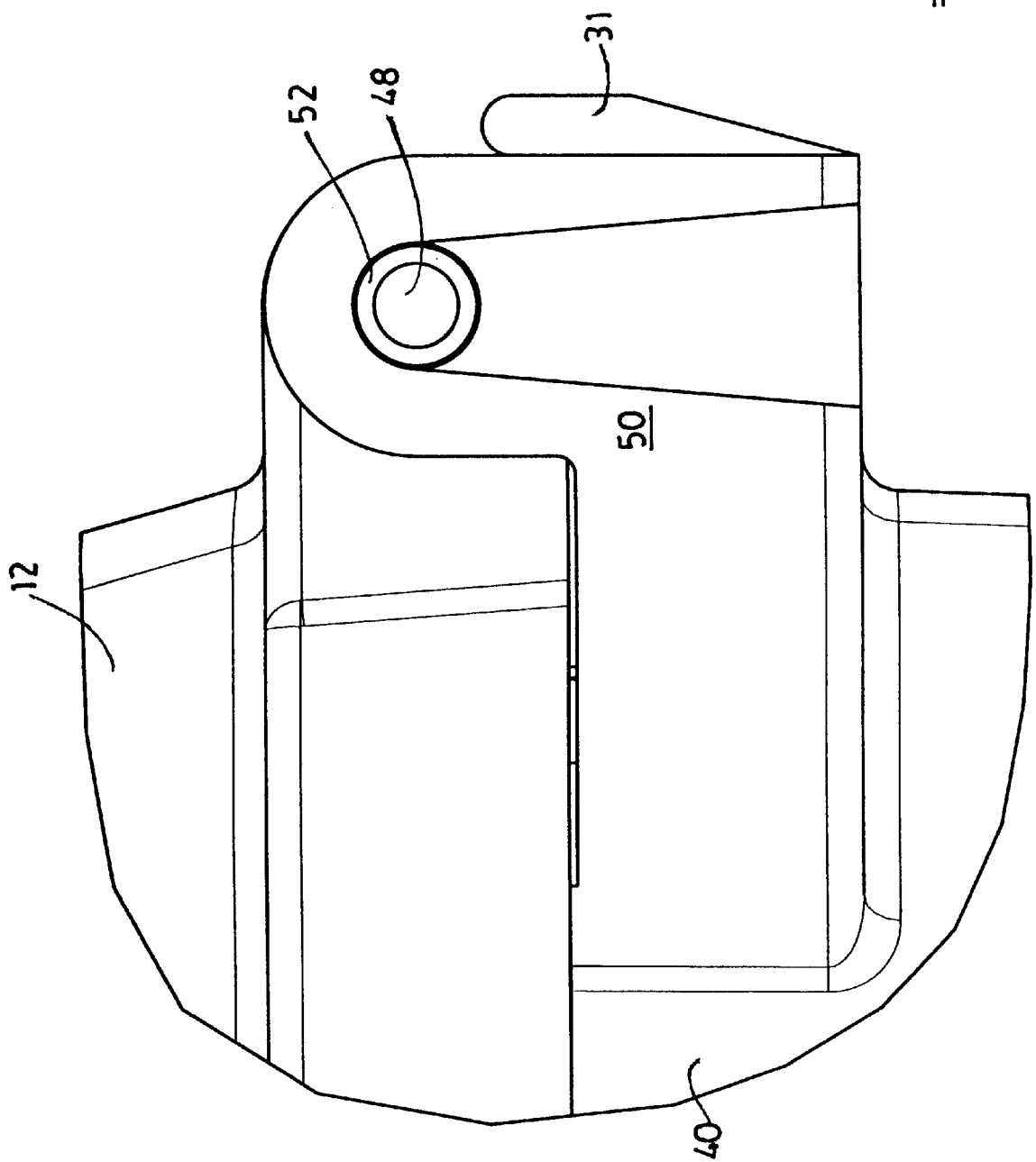

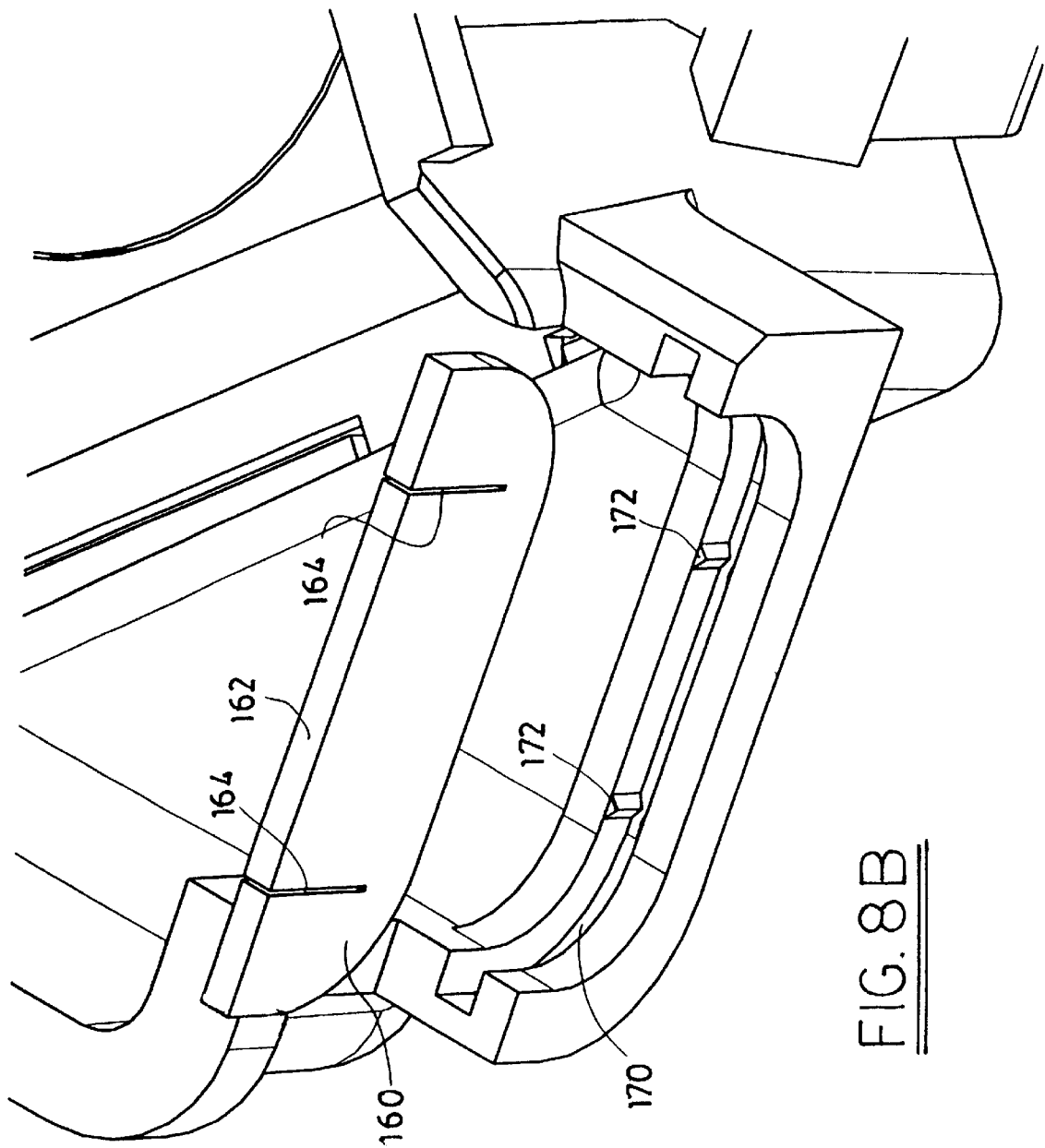

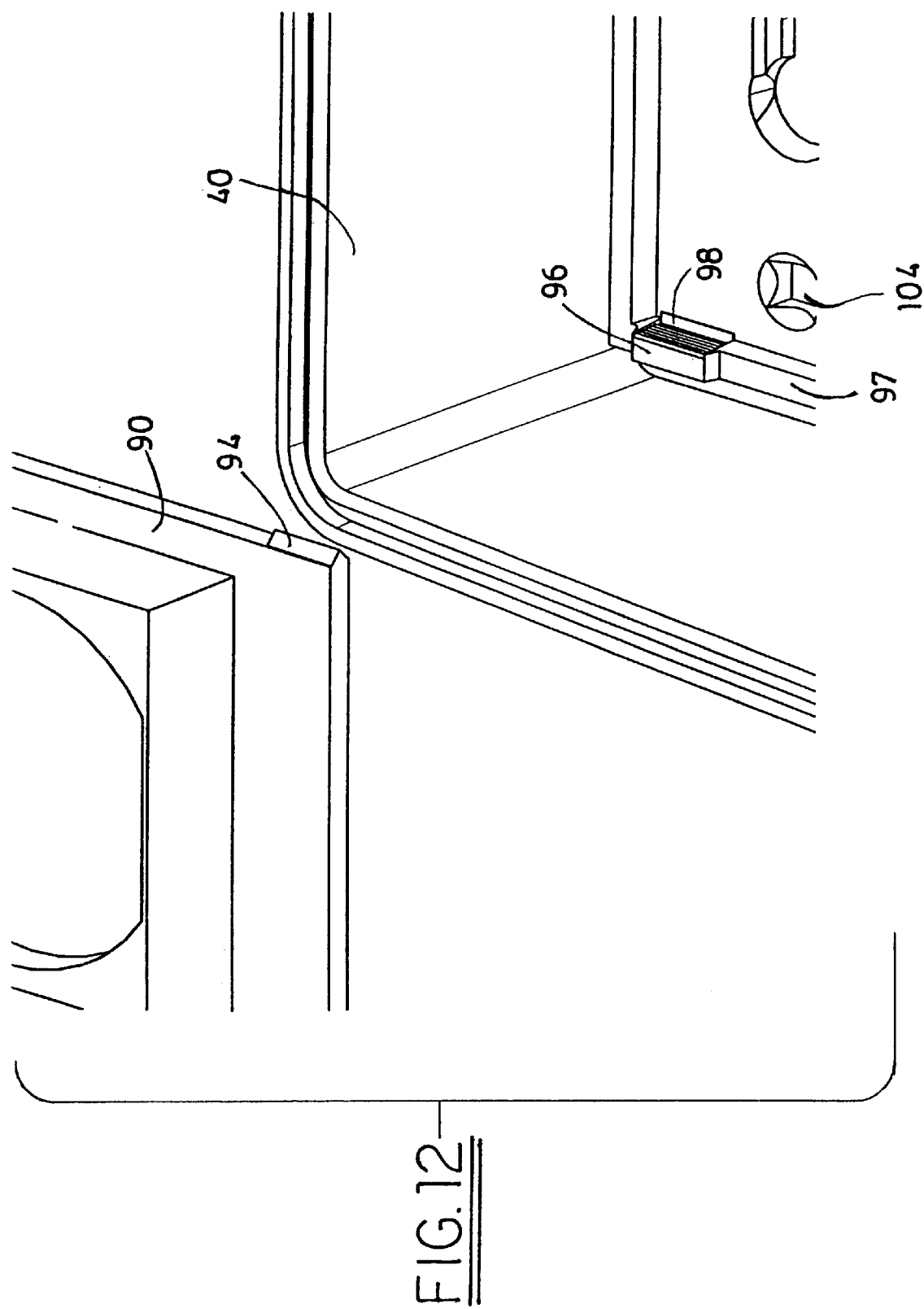

WEATHERPROOF OUTLET COVER

FIELD OF THE INVENTION

The present invention relates to weatherproof outlet covers, and more particularly to an outlet cover which can provide weatherproof protection for either a vertically or horizontally mounted receptacle and which can provide protection when the receptacle is in use.

BACKGROUND OF THE INVENTION

It is commonplace to have electrical outlets placed outdoors in order to supply the electricity required by outdoor lighting, outdoor yard equipment, outdoor recreation equipment, and the like. Where electrical outlets are placed outdoors, the damaging effects of weather conditions require a weather-resistant outdoor electrical outlet cover.

Weatherproof and weather-resistant covers are used in conjunction with electrical boxes or other housings to protectively enclose various electrical devices. Such covers are particularly useful to afford ready access to exterior electrical outlets while protecting them from moisture and weather.

The typical electrical outlet box is generally rectangular and is closed on five sides and is recessed into or mounted exteriorly of a structure so that its open side is accessible. The box is typically sized to receive a standard electrical device such as a duplex outlet or switch and the device is secured to the box with its front face substantially flush with the open face of the box. An opening in a wall of the box permits passage of electrical leads for connecting the device to an electrical source or to another such fixture.

The cover assembly of the general type with which we are concerned here includes a cover plate which is co-extensive with the open side of the outlet box. That plate is provided with one or more apertures shaped and located so as to expose the working parts of the device contained in the box while isolating the electrically live parts of the device. The cover is usually secured in place by one or more threaded fasteners extending through an opening in the cover and turned down into a threaded hole in the box or in the device contained therein.

The usual weatherproof cover assembly also includes one or more doors or lids hinged to the cover plate to protect the electrical fixture mounted in the associated box from the weather when the fixture is not in use. In some cases, a single door protects an entire fixture, but sometimes, each aperture in the cover plate has its own door so that, for example, one receptacle of a duplex outlet can be in use while the other outlet receptacle is protected from the weather by an overlying door.

Most prior outdoor cover assemblies are disadvantaged in that they provide protection against the weather only when the associated electrical fixtures are not in use, i.e., when the cover plate doors are closed. As soon as the doors are swung open to provide access to the associated electrical device, those fixtures are exposed to the elements and become vulnerable to damage from the elements.

There exist some cover assemblies which protect the associated electrical devices, usually electrical outlets, from the weather when the fixtures are in use. This feature is convenient because it is sometimes preferred to leave certain outdoor appliances plugged into an outdoor outlet for extended periods of time. Examples of such appliances include outdoor lighting such as spotlights. Even when an appliance is not intended to be left plugged in for an extended period of time, it is also sometimes preferred to provide weather resistant protection for the appliance plug during use. These known assemblies which can protect outlets during use have hinged lids or doors which are deep enough to provide clearance for a plug or plugs plugged into the electrical outlet being protected by the cover assembly. Those assemblies also include openings for accommodating the electrical cords terminated by the plug or plugs, which openings are located at the bottoms of the assemblies so that the openings do not admit rainwater.

One of the disadvantages of these types of devices is that only a vertically aligned electrical outlet may be satisfactorily protected from varying weather conditions. If the above-described devices with the bottom openings were placed on a horizontally aligned electrical outlet, the opening for the appliance cord would no longer be oriented downward thereby creating a greater likelihood that water, moisture or other substances would enter the protected area. Accordingly, such covers would be unsuitable for protecting horizontally aligned electrical outlets. Of course, manufacturers could make an entirely separate line of outlet covers, one for horizontal outlets and one for vertical outlets and retailers could stock both types; however, this could lead to greater costs associated with manufacturing and stocking more product lines. Moreover, when a consumer is considering purchase of an outlet cover, he must remember the orientation of the outlet for which the cover is intended.

The prior art has shown some attempts at solving the above-described problems. U.S. Pat. No. 4,109,095 to Kling et al discloses a box cover containing a pair of spring biased lids which fit together to seal an electrical cord extending out of the cover. The two lids contain an interlocking gear mechanism in order to synchronize the movement of the two lids. While the '095 device is capable of enclosing a horizontally or vertically aligned outlet, the outlet cover is relatively complicated and requires a large number of parts. Moreover, the outlet cover described in the '095 patent prevents easy accessibility for the insertion of an electrical plug.

Another attempt at solving the above-described problems is shown in U.S. Pat. No. 5,280,135 to Berlin et al. The '135 patent discloses a cover including a base plate to be mounted on an outlet with an insert member mounted within an aperture in the base plate. The insert may be fitted in the aperture in a plurality of orientations to encompass electrical outlets of either a horizontal orientation or a vertical orientation. A protective housing is fastened to the base plate in order to enclose the electrical outlet and defines a closed space of sufficient size to enclose an electrical outlet with at least one plug inserted thereinto irrespective of the orientation of the outlet. A gap is provided at the bottom of the cover for allowing a cord to extend out of the housing while the housing is closed. While this cover may be used on either vertically or horizontally oriented outlets, the size of the protective housing necessary to enclose either orientation of outlets is quite greater than necessary when only one orientation is being employed and therefore makes the cover undesirable. In addition, the removable insert is an item which can get lost from the rest of the cover device. Furthermore, the gap defines a hole which renders the cover less than weather proof, as raindrops can bounce upwards from surrounding objects into the cover.

Thus, there is a need for a weatherproof outlet cover which can enclose an electrical outlet even during use. There is further a need for a weatherproof outlet cover which can be used on either vertically or horizontally oriented electrical outlets. There is further a need for such a weatherproof outlet cover which does not considerably increase the size of the device. There is further a need for such a weatherproof outlet cover which does not allow the entry of rain water through the exiting area for electrical cords in either orientation. There is further a need for a weatherproof outlet cover which meets the above needs while also meeting safety regulations.

SUMMARY OF THE INVENTION

Thus, it is an object of the present invention to provide a weatherproof outlet cover that can be mounted to either a horizontal or vertically oriented outlet, while still being gravity biased in a closed position in either orientation.

It is another object of the present invention to provide such a weatherproof outlet cover which can protect the outlet while the outlet is in use.

It is another object of the present invention to provide such a weatherproof outlet cover which does not allow the entry of rain water and other natural debris through an exit opening for electrical cords.

It is a further object of the present invention to provide such a weatherproof outlet cover which does not require the removal of existing screws for installation.

It is a further object of the present invention to provide such a weatherproof outlet cover with a wall plate which can be snapped into place and easily removed.

It is yet another object of the present invention to provide such a weatherproof outlet cover with features which secure the housing in a closed position.

It is a further object of the present invention to provide such a weatherproof outlet cover with a hinge that diverts rain water away from collecting towards the mating surfaces of the housing and back body.

Other objects will in part be obvious and in part appear hereinafter.

In a preferred embodiment of the present invention the weatherproof outlet cover comprises a back body having a first pair of parallel edges and a second pair of parallel edges, the first pair of parallel edges and the second pair of parallel edges defining lines substantially perpendicular to each other, a housing pivotally connected to the back body, and a pivot mount for mounting the housing to the back body, wherein the pivot mount defines a pivot axis which defines a line which is at a non-zero and non-perpendicular angle to the edges of the back body. In other words, the housing can be mounted using the pivot mount in either a first orientation or a second orientation, the first and second orientations being orthogonal, wherein the housing is gravity biased to fall into a closed position in both the first orientation and the second orientation. The housing is gravity biased in this manner because the housing has a center of gravity wherein, in the closed position, the center of gravity lies in a first horizontal plane and a first vertical plane, and in the open position, the center of gravity lies in a second horizontal plane and a second vertical plane, different from the first horizontal plane and the first vertical plane, respectively.

The back body and the housing are preferably generally rectangular, a portion of the pivot mount extending from a corner of the back body and a portion of the pivot mount extending from a corner of the housing. An exit opening extends from a corner diagonally opposite the corner where the pivot mount extends.

The pivot mount may include a pin supporting member extending from the housing, the pin supporting member including a pair of axially aligned pins, and a receiving section extending from the back body, the receiving section including a pair of axially aligned holes for receiving the pins.

Two features are preferably provided for securing the housing in a closed position. A pair of lock holes are preferably provided, one on the back body and one on the housing which align when the housing is in a closed position for accepting a securing device such as a combination or key lock. In addition, a releasable latch may be provided for snapping the housing into a closed position wherein the latch extends from the back body and includes a catch facing the housing.

The back body includes a rear opening for surrounding the electrical outlet, the cover further comprising a wall plate insertable over the opening. The wall plate and back body preferably include a snap-on connection including a latching pawl extending from the wall plate and a rack of teeth provided on the back body.

The rear opening may be in a rear wall of the back body, the rear wall further including a pair of screw openings, each screw opening including an oversized circular hole through which a head of a screw may pass, and a slot extending from the hole, the slot sized to accept a shaft of a screw, but sized to prevent a screw head from passing through. A recessed area may surround the slot, the recessed area recessed from a plane defined by the rear wall of the back body. Thus, existing screws need only be backed out, rather than removed completely, when installing the wall plate.

A layer of sealing material may be behind a rear wall of the back body to further add to the weatherproof nature of the cover. In addition, the pivot mount preferably includes a baffle designed to force water down and away from the mating surfaces of the back body and housing. Furthermore, the exit opening for the exiting cords preferably includes a pair of rubber flaps which prevent back-splashing into the enclosure.

The foregoing and other features and advantages of the invention will be more readily understood and fully appreciated from the following detailed description, taken in conjunction with the accompanying drawings.

BRIEF DESCRIPTION OF THE DRAWINGS

FIG. 4A shows a top plan view of one embodiment of the present invention installed over a vertically oriented electrical outlet with the housing in a closed position.

FIG. 6A shows a side perspective view of one embodiment of a hinge for the cover of the present invention, with the housing separated from the back body, and FIG. 6B shows a side plan view of the housing connected to the back body through the hinge.

FIG. 8A shows an exploded perspective view of a watertight design for the cord opening and FIG. 8B shows a close-up of a portion of the cord opening with watertight design structure shown in FIG. 8A.

FIG. 12 shows a partial exploded perspective view of a wall plate and back body of FIG. 9.

DETAILED DESCRIPTION OF THE PREFERRED EMBODIMENTS

Figure 1:
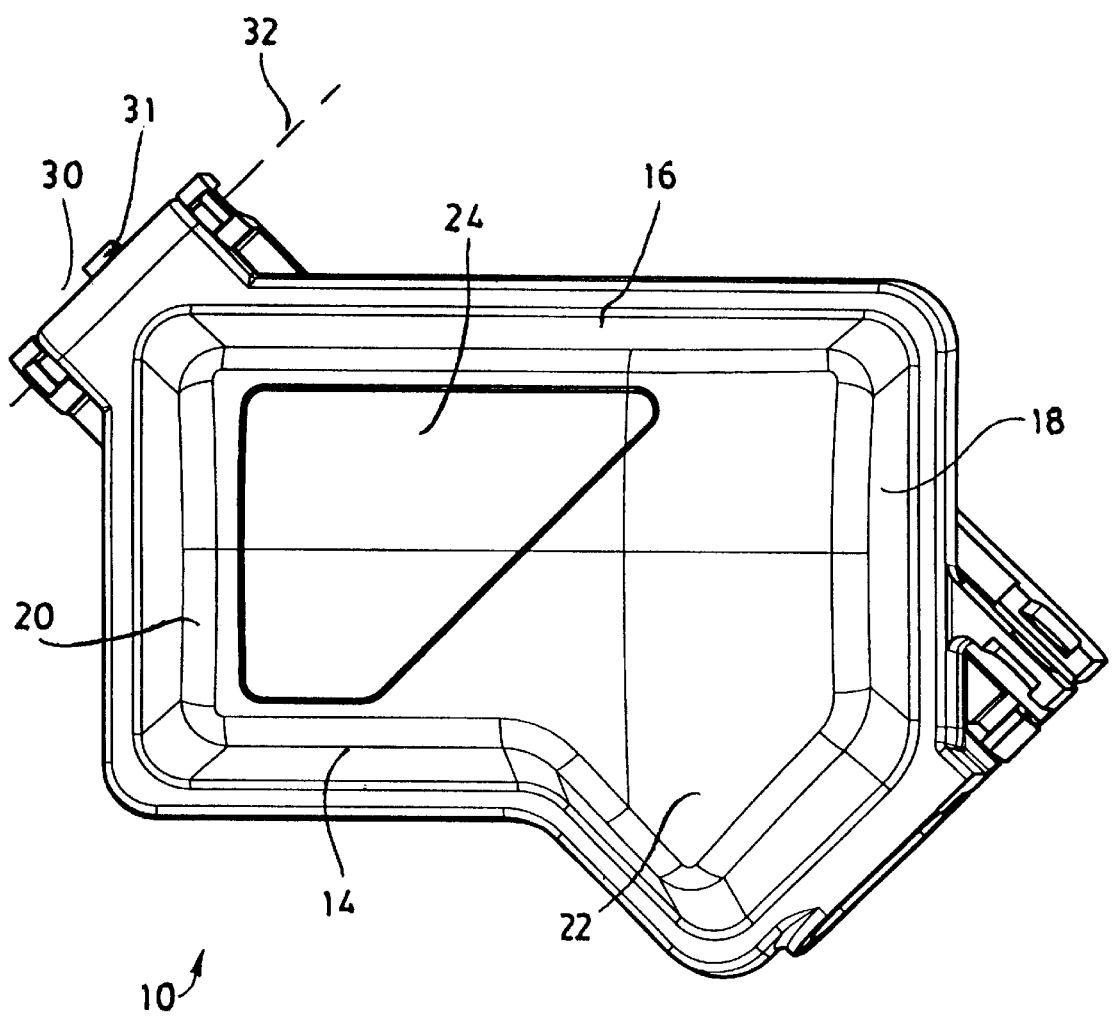
FIG. 1 shows a top plan view of a weatherproof outlet cover according to the present invention.
Figure 2:
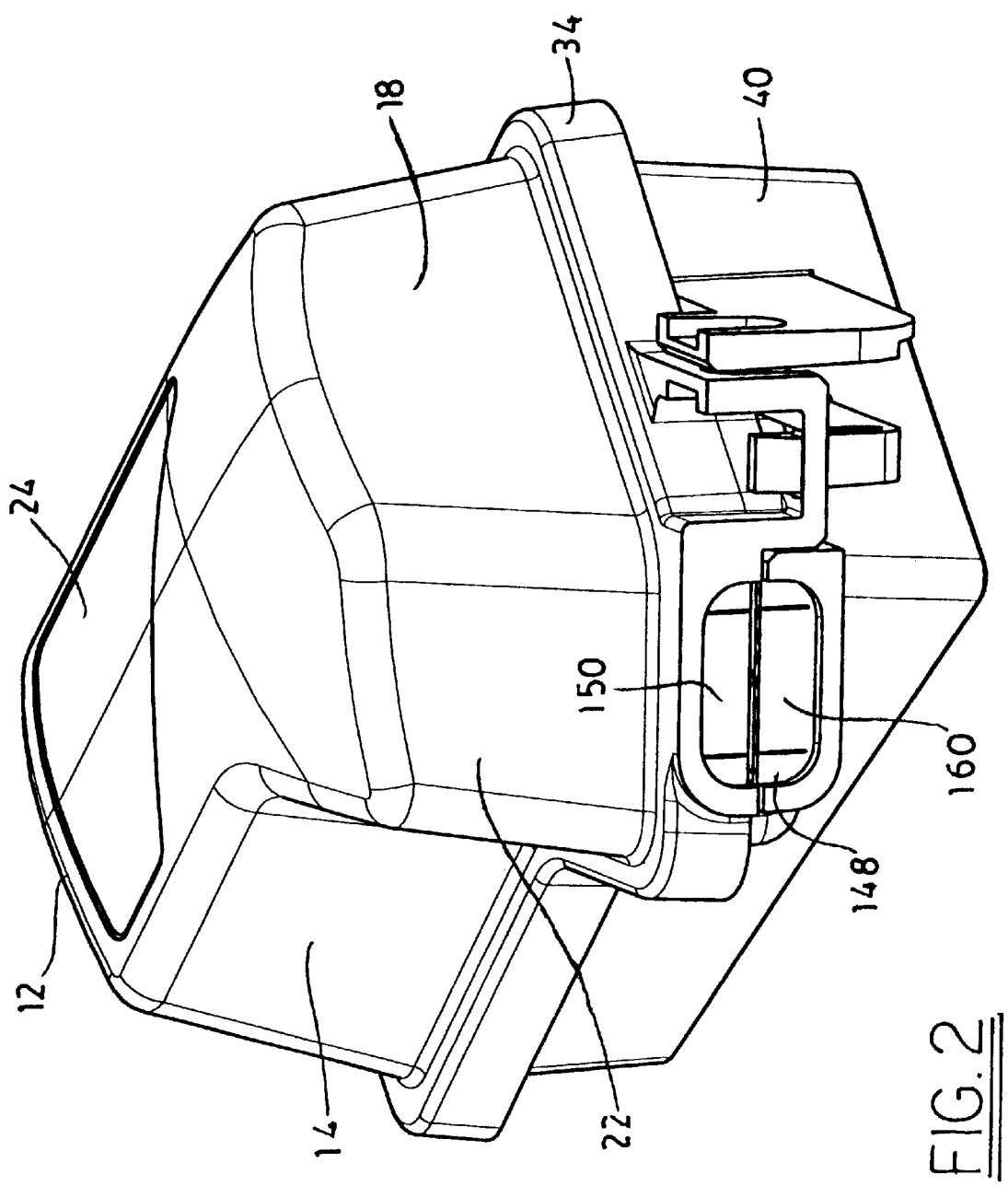
FIG. 2 shows a left side perspective view of the weatherproof outlet cover of FIG. 1.
Figure 3:
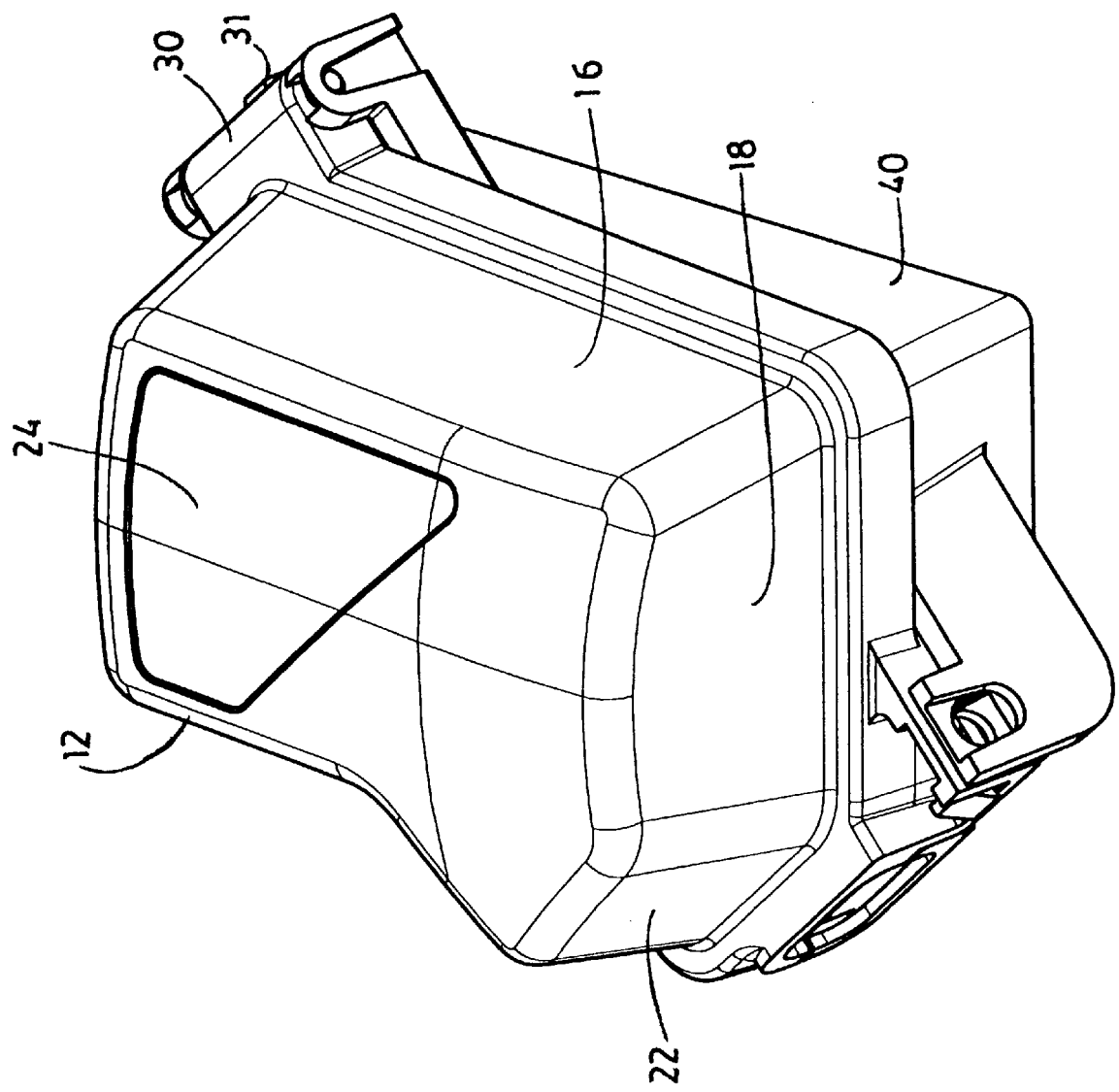
FIG. 3 shows a right side perspective view of the weatherproof outlet cover of FIG. 1.

FIGS. 1–3 show various views of the weatherproof outlet cover 10 of the present invention with the housing 12 in a closed position. The housing 12 is preferably generally rectangular in shape with a first pair of opposed sides 14 and 16 and a second pair of opposed sides 18 and 20. These opposed sides may be parallel, however they may also be disposed in planes which angle upwards towards a top panel 24 so that the housing has a tapered appearance. In such an embodiment, the edges of the sides may be parallel. A protrusion 22 may extend from one or two sides of the housing 12 to provide housing for an exiting cord, as will be explained. The housing 12 further includes a top panel 24 which is dimensioned to cover at least one electrical outlet, and is preferably dimensioned to cover one standard duplex receptacle and wall plate. Of course, the housing 12 could also be sized to cover a pair or more of duplex receptacles, or multi-gang boxes, and any other type of power outlets or communication conductor outlets (i.e. for phone cords, computer cords, etc.). The housing 12 thus includes a set of side walls and a top wall.

The cover 10 further includes a hinge or pivot mount 30 which is positioned at one of the corners of the housing 12. For example, as shown in FIG. 1, the hinge 30 is positioned between side walls 16 and 20. The angle of the hinge axis 32 relative to its adjacent sidewalls 16 and 20 is between 30 and 60 degrees, and is preferably 45 degrees relative to each sidewall.

The location of the hinge 30 relative to the housing 12 allows the housing 12 to close under its own weight due to gravity whether the housing 12 covers a horizontally oriented or vertically oriented outlet. Thus, the housing 12 can meet safety regulations for both orientations of an outlet, without unduly increasing the size of the housing 12. In a preferred embodiment of the cover 10, the hinge 30 further includes a stop 31 which, in the event the cover 10 is mounted on a surface other than a wall, will prevent the housing 12 from over rotating, which would inhibit the ability for the housing 12 to self-close due to gravity. The stop 31 should not be necessary when the cover 10 is mounted to a wall, because the wall itself would prevent the housing 12 from over rotating, and would ensure that the housing 12 would always close due to gravity. Nonetheless, the stop 31 is preferably included in the manufacture of the product so that the cover 10 can be mounted in any location (such as, for example, on a post in the middle of a yard) and still meet safety regulations by self-closing under the influence of gravity. In the open position, the housing 12 should not open more than 120 degrees, and preferably not open more than 90 degrees.

The housing 12 for the outlet cover 10 will be described in combination with a backbody 40 which can surround an outlet. Under some circumstances, it may be possible for the housing 12 with angled pivot 30 to be used without a backbody 40, and instead to be mounted directly to a wall surrounding the outlet to cover. In such a case, only pivot 30 would be mounted to the wall and the housing 12 would be hinged to the pivot 30 such that the housing 12 would cover the outlet when in a closed position and provide access to the outlet when in an open position. An outlet cover without the backbody 40 would, of course, have to use alternate measures to insure the weatherproof nature of the cover, such as providing a flexible seal around the edges of the housing 12 or surrounding wall.

Preferably, the weatherproof outlet cover 10 includes a backbody 40 as shown in FIGS. 2 and 3, which may have a complementary shape to that of the housing 12. That is, the backbody 40 may be generally rectangular with its own set of sidewalls. For engaging the housing 12 with the backbody 40, a lip 34 may surround a bottom edge of the sidewalls of the housing 12. When in a closed position, the lip 34 of the housing 12 slightly overlaps the sidewalls of the backbody 40. The overlapping nature helps to insure weatherproofness. Alternatively, rather than a lip 34, the sidewalls of the housing 12 could be dimensioned to overlap sidewalls of the backbody 40. The cover of the present invention is preferably designed with a depth adequate to enclose a plug and the curvature of its exiting cords. That is, if the cover does not include the back body, then the housing should include sidewalls with a width slightly larger than the length of a plug and its cord. If the cover does include the back body, then the combined width of the sidewalls of the housing and the back body in a closed position should be slightly larger than the length of a plug and its cord. Thus, protection can be provided for the outlet when the outlet is in use.

Figure 4B:
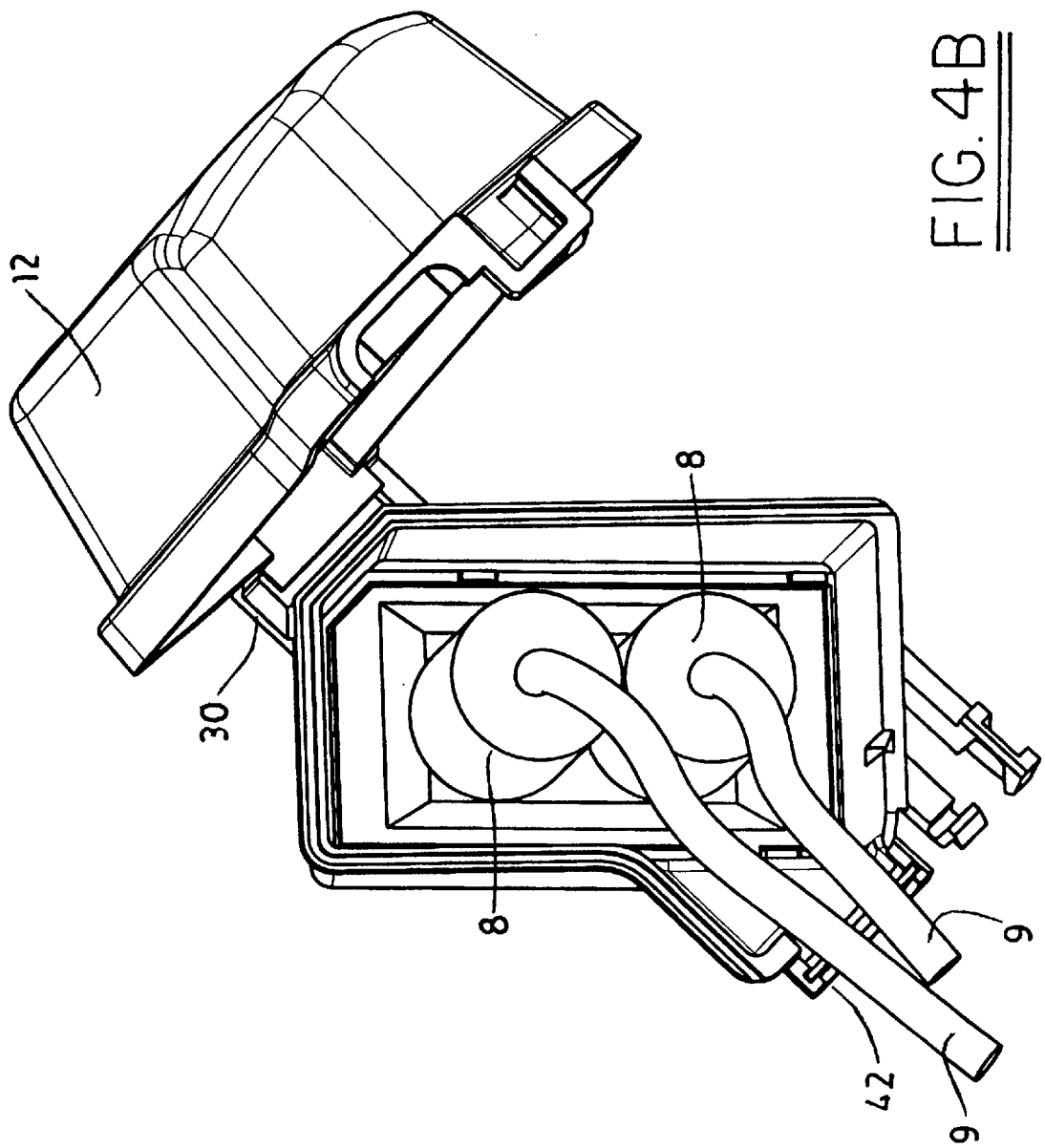
FIG. 4B shows a top perspective view of the housing in an open position.

FIGS. 4A and 4B show a vertical orientation of the weatherproof outlet cover 10. FIG. 4A shows the housing 12 attached to a back body 40 at a pivot mount 30 which is angled approximately 45 degrees from a centerline CL of the cover 10, the housing 12 being in a closed position. As shown in FIG. 4B, when the housing is moved to an open position, the outlets (hidden from view) can be accessed and filled with plugs 8 which have cords 9. The cords 9 can be draped towards an exit area or opening 42. The exit opening 42 is provided at a corner diagonally opposite the corner where the hinge 30 is located. If not held open, the weight of the housing 12 will cause the housing 12 to fall from the open position shown in FIG. 4B to the closed position shown in FIG. 4A. The protruding area 22 points generally downward to protect the exiting cords from sideways rain entrance as does a watertight closure 148 which will be discussed further below with respect to FIGS. 8A and 8B.

While standard outlet covers with a top hinge or pivot can adequately cover the vertically orientated position shown in FIGS. 4A and 4B, they cannot be turned sideways, as can the present invention, to protect a horizontally oriented outlet. This is because the hinge on the top would then be located on the side, and would prevent the ability of the housing to close under its own weight through the force of gravity. A user who forgets to close the housing would be left with an uncovered outlet. In addition, the bottom exit openings of a standard outlet cover would allow for the entrance of angled rain water when the cover is horizontally oriented and the openings are then on a side rather than the bottom. Thus, standard outlet covers are not suitable for both orientations as is the present invention.

Figure 5A:
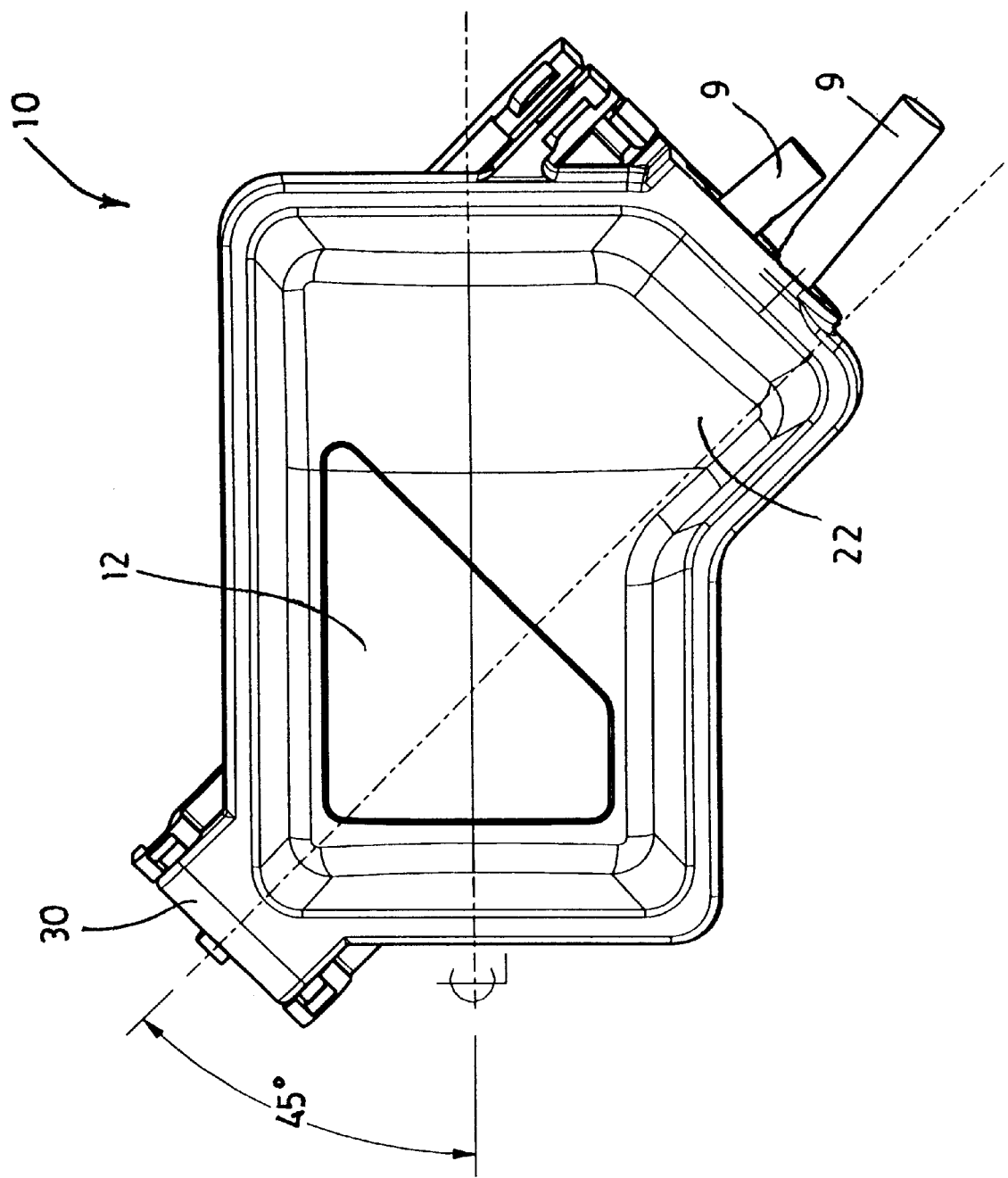
FIG. 5A shows a top plan view of one embodiment of the present invention installed over a horizontally oriented electrical outlet with the housing in a closed position.
Figure 5B:
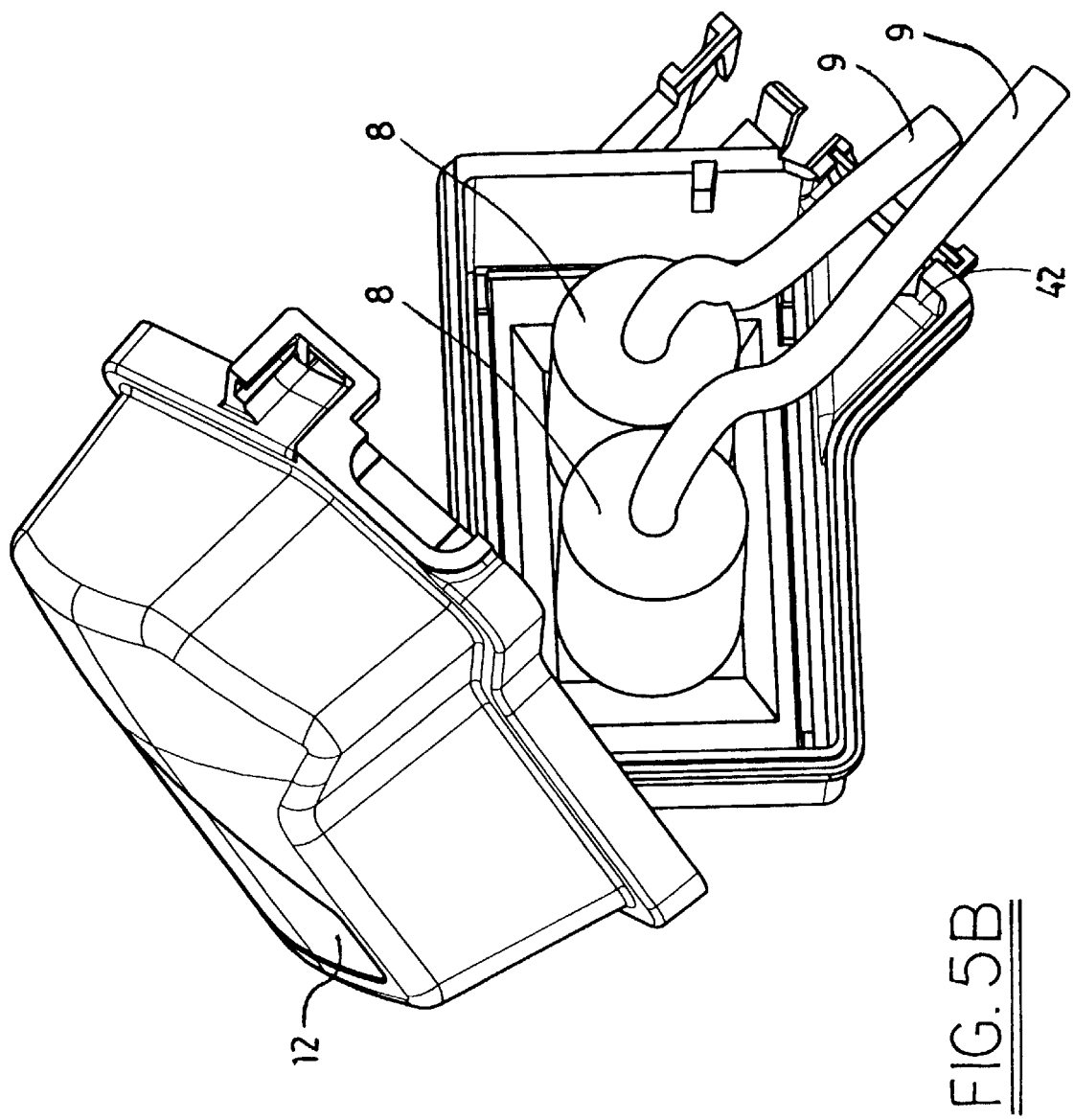
FIG. 5B shows a top perspective view of the housing in an open position.

Now turning to FIGS. 5A and 5B, the great advantage of the angled pivot 30 is demonstrated. FIGS. 5A and 5B show a horizontal orientation of the weatherproof outlet cover 10. FIG. 5A again shows the housing 12 attached to the back body 40 at a pivot mount 30 which is angled approximately 45 degrees from a centerline CL of the cover 10, the housing 12 being in a closed position. As shown in FIG. 5B, when the housing is moved to an open position, the outlets (hidden from view) can be accessed and filled with plugs 8 which have cords 9. The cords 9 can be draped towards an exit area or opening 42. The exit opening 42 is provided at a corner diagonally opposite the corner where the hinge 30 is located. Despite the 90 degree change in position from that shown in FIGS. 4A and 4B, the exit opening 42 still faces generally downward to prevent the entrance of angled rainwater. Again, if not held open, the weight of the housing 12 will cause the housing 12 to fall from the open position shown in FIG. 5B to the closed position shown in FIG. 5A. Thus, the outlet cover 10 functions equivalently as it does when the cover is mounted over a vertically oriented outlet, without requiring any changes on the part of the cover other than installation direction. Thus a single type of cover can be used for either horizontally or vertically installed outlets, while still ensuring that the housing will always remain closed when not held in an open position and still providing adequate weatherproof protection in the closed position.

The hinge 30 to which the housing 12 is pivotally mounted to either the wall surrounding the outlet or the backbody 40 may be any suitable hinge or pivot structure, so long as the pivot axis of the hinge is at the approximately 45 degree angle to the centerline CL of the cover 10. Thus, the pivot axis of the hinge 30 defines a line which is at a non-zero and non-perpendicular angle to the edges of the side walls of the back body 40. By edges, it is intended to encompass both the top edges of the side walls near the opening and the bottom edges of the side walls near the rear wall.

The housing 12 is gravity biased in a closed position in either of the orthogonal positions, vertical or horizontal. This is due to the relative location of the center of gravity of the housing 12 in the closed and open positions. In a standard hinged cover, when the hinge is located along a top wall, the center of gravity defines a first horizontal plane and a first vertical plane when the housing is in a closed position. When the housing is moved to an open position, the center of gravity lies in a different horizontal plane, but the same first vertical plane. In a hinged cover where the hinge is on a side wall, the center of gravity again defines a first horizontal plane and a first vertical plane when the housing is in a closed position. When the housing is moved to an open position, the center of gravity lies in a different vertical plane, but the same first horizontal plane. On the contrary, the present invention provides for a housing which, when moved to an open position, locates the center of gravity in both a different horizontal plane and a different vertical plane than when in a closed position.

One embodiment for connecting the housing 12 to the backbody 40 is shown in FIGS. 6A and 6B. The housing 12 is provided with a pin supporting member 46 from which projects two pins 48, extending in opposite directions along a shared axis. The back body 40 is provided with a receiving section 50 for the pin supporting member 46 which includes a pair of holes 52 formed in receiving arms 51. The holes 52 lie along the pivot axis 32. During assembly, the pins 48 may be pushed into guide grooves in the receiving arms 51 and snapped into the holes 52 such that the housing 12 can pivot about the pivot axis 32. FIG. 6B shows one pin 48 in place within a hole 52 of the receiving section 50. Of course, it would be within the scope of this invention to provide the pins as an extension of section 50 and holes within the member 46.

Figure 7A:
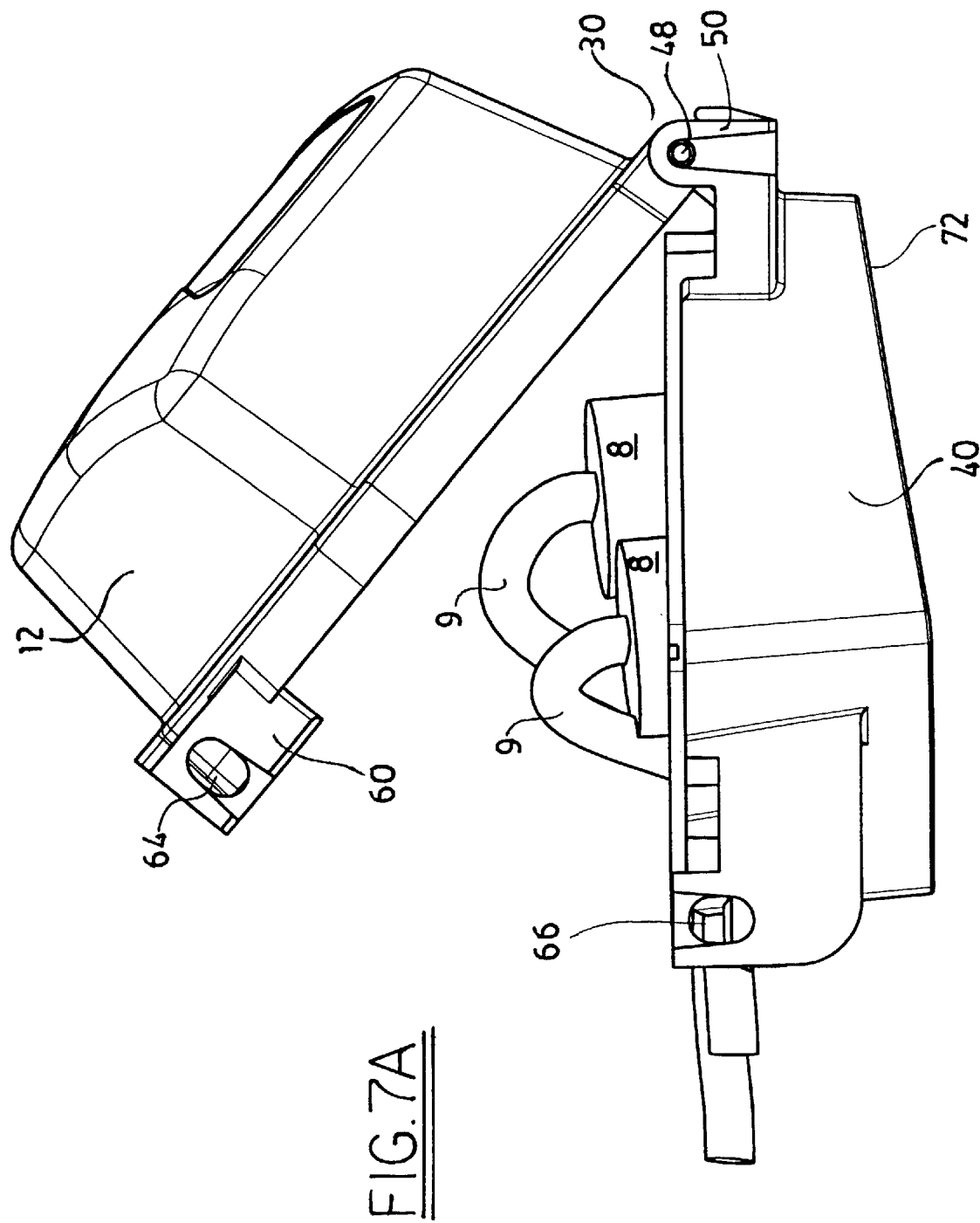
FIG. 7A shows a side perspective view of the cover of the present invention with the housing in an open position and FIG. 7B shows a side perspective view with the housing in a closed position, with the snap actuated and the lock holes aligned.
Figure 7B:
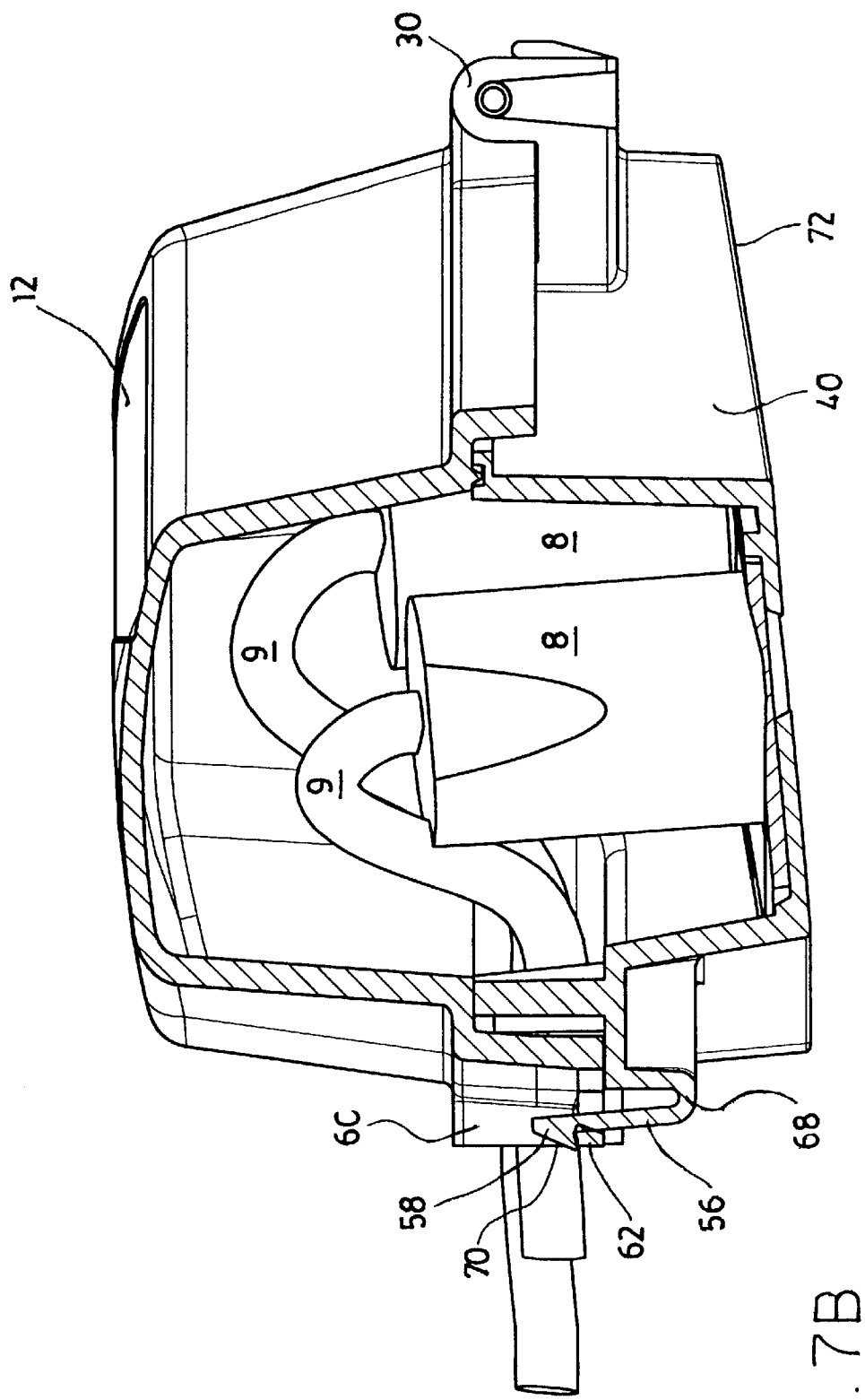

Two features are preferably provided on the weatherproof outlet cover 10 of the present invention to retain the housing 12 in a closed position. These features preferably include a snap which is activated when the housing 12 is moved to a closed position over the back body 40 and a pair of aligned lock holes through which a securing device such as a combination lock or key lock can be inserted. While any snap arrangement is within the scope of this invention, it is preferred that the snap self-actuates when the housing 12 is moved to the closed position, and retains the housing 12 in a closed position until the snap is manually released. For example, FIGS. 7A and 7B show a snap having a latch 56 extending from a bottom sidewall of the back body 40. An outwardly projecting catch 58 extends from a top of the latch 56. Extending from the housing 12 is a snap and lock section 60 which includes a bulbous inwardly projecting protrusion 62. When the housing 12 is moved from its open position shown in FIG. 7A to the closed position shown in FIG. 7B, the snap and lock section 60 moves into engagement with the catch 58 of the latch 56. The latch 56 includes an arm 68 which is slightly bendable such that the protrusion 62 can move along a cam face 70 of the catch 58 while the latch 56 is moving slightly inward, towards the backbody 40. When the protrusion 62 reaches the end of the cam face 70, the catch 58 returns forward, away from the back body 40, and the protrusion 62 rests underneath the catch 58, as shown in FIG. 7B. The housing 12 cannot be moved back to its open position unless the arm 68 of the latch 56 is pushed slightly inward so that the catch 58 can release the protrusion 62 of the snap and lock section 60. Thus, heavy gusts of wind can not move the housing 12 into an open position, thereby preventing rainwater from entering the outlets.

While the above-described snap mechanism is suitable for securing the cover 10 in a closed position for complete weatherproof protection, it cannot adequately protect against unauthorized usage. For preventing unauthorized access of the protected outlets, a pair of lock holes 64 and 66, provided on the housing 12 and the back body 40, respectively, are provided which align together when the housing 12 is moved into a closed position. When aligned, a securing device such as a combination lock or key lock can be inserted through the aligned holes, thus limiting access of the outlets contained within to the bearer of the key or combination. Of course, other securing devices could be used such as rope, string, chains, etc. which may be tied tightly and may at least prevent unauthorized access by children. Although the positions of the lock hole 66 and latch 56 are as shown, it should be understood that the positions could be reversed and that either position is within the scope of this invention and that the relative positions do not affect the function of the snap and lock holes, so long as the positions of the protrusion and lock hole on the housing 12 correspond with the positions of the snap and lock hole on the back body 40.

As further shown in FIGS. 7A and 7B, a layer of sealing material 72 may be secured to a rear wall of the back body 40. In this manner, the seal 72 bridges the back body 40 to a wall or surface surrounding the electrical receptacle and ensures a waterproof connection of the back body 40 to the wall or surface. The seal 72 may be a foam seal or any other suitable, waterproof sealing material. When a rear wall of the backbody 40 is secured to a wall or surface, the seal 72 may be slightly compressed to ensure a watertight connection.

Figure 8A:
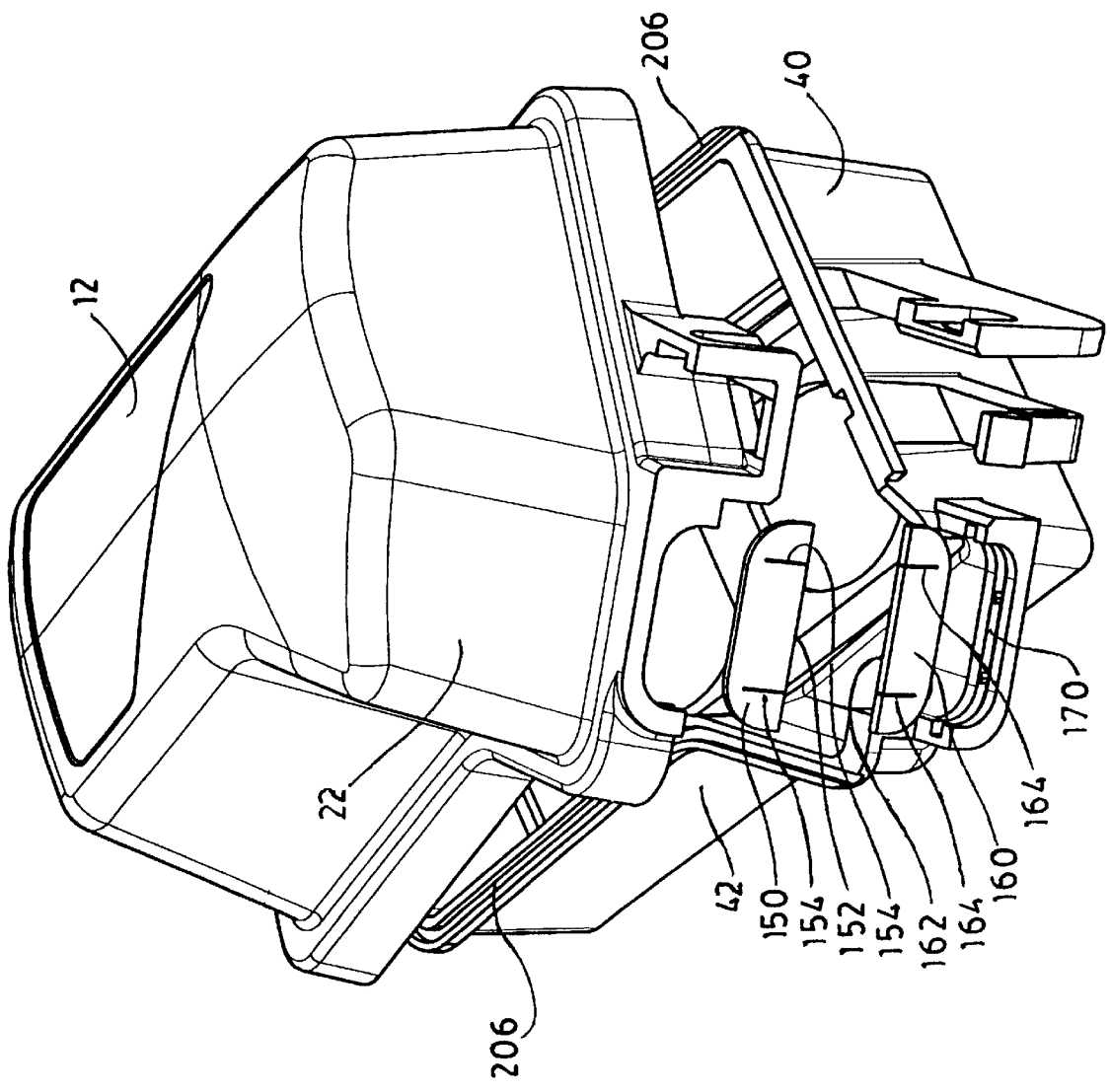

Additional weatherproofing design features are shown in FIGS. 8A–8F. FIGS. 8A and 8B illustrate a watertight design for the cord opening 42. Referring back to FIG. 2, the watertight closure 148 is shown in the closed position. In this position, two rubber flaps 150 and 160 have surface 152 to surface 162 contact which prevents water from "back-splashing" up into the enclosure. Each of the flaps 150 and 160 are provided with a pair of slots, 154 and 164, respectively, which are aligned in a closed position. The slots 154 and 164 allow the cords 9 to exit the enclosure and also wrap around the exiting cords to further prevent the back-splashing effect of the water. FIGS. 8A and 8B illustrate how the rubber flaps 150 and 160 may be installed into the base 40 and housing 12. The exit opening 42 on each of the base 40 and housing 12 is provided with a groove 170 which accepts the rubber flap 150 or 160. Preferably, the groove 170 also includes teeth 172 which keep the rubber flap 150/160 in place.

Figure 8C:
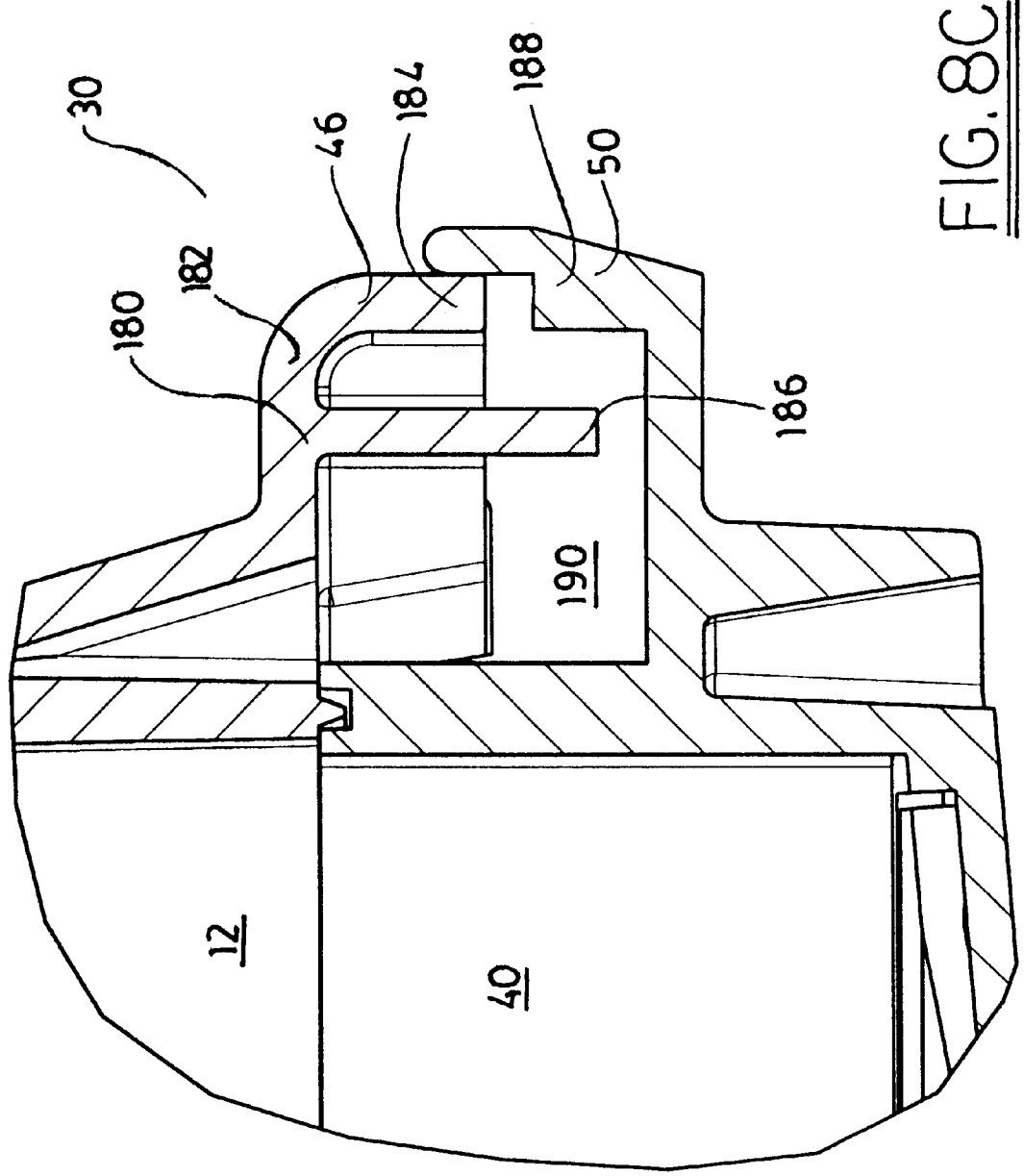
FIG. 8C shows a cross-sectional view of a hinge baffle to direct water down and away from the mating surfaces of the housing and back body.
Figure 8D:
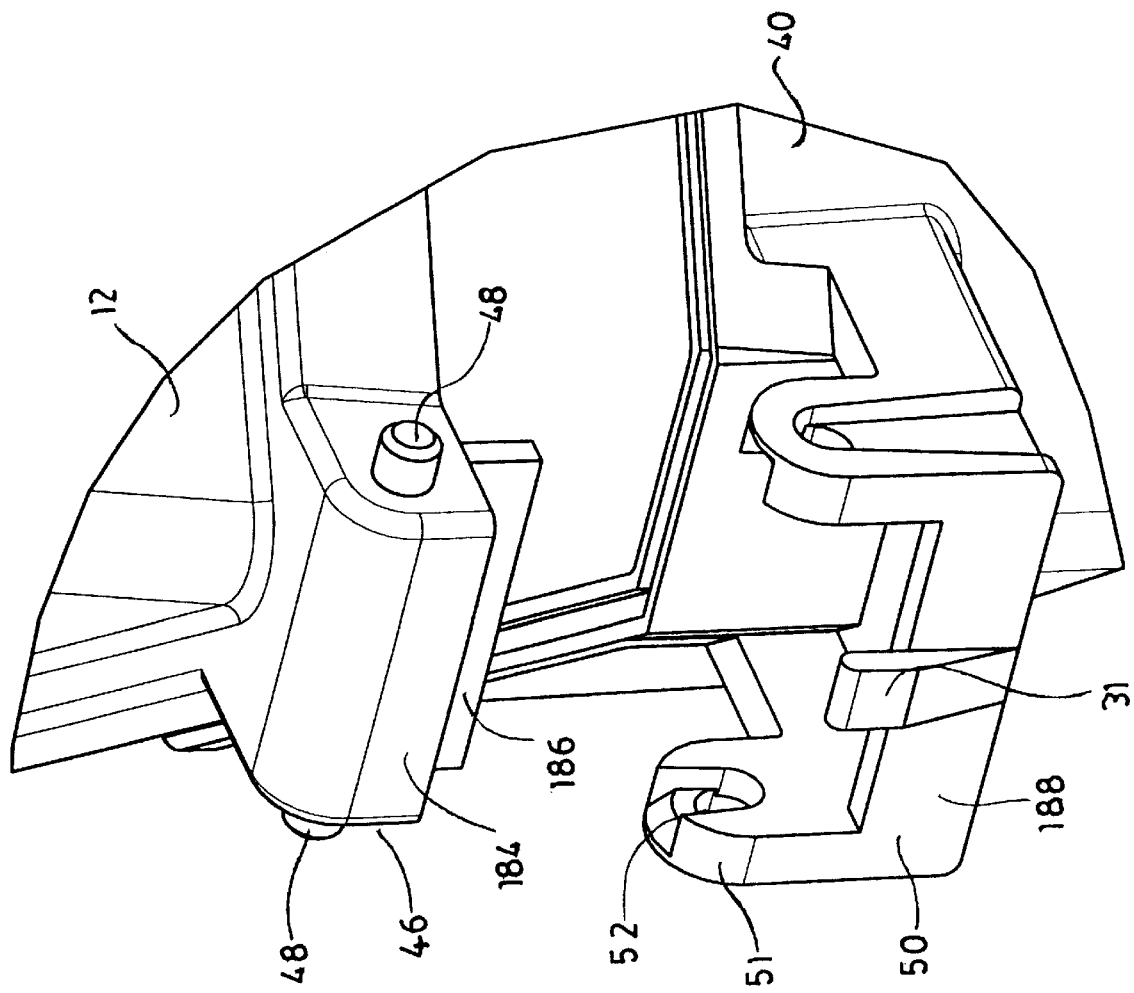
FIG. 8D shows another side perspective view of the hinge for the cover of the present invention, with the housing separated from the back body.

Turning now to FIGS. 8C–8D, a preferred embodiment of the invention may further comprise a baffle 180 for the hinge 30. The baffle 180 is designed to force water down and away from the mating surfaces of the housing 12 and back body 40. As shown in FIG. 8C, the baffle 180 is found in the interior cross-section of the pin supporting member 46. The baffle 180 includes a body 182, a first leg 184, and a second leg 186. The first leg 184 forms an outer portion of the pin supporting member 46 and extends downwardly towards an outer portion 188 that extends upwardly from the receiving section 50 between the receiving arms 51. The second leg 186 extends within the space 190 in the receiving section 50. When the pin supporting member 46 is seated within the receiving section 50 as shown in FIG. 8C, the baffle 180 directs any incoming rain or other water or impurities from the space 190 in the hinge 30 and away from the mating surfaces of the housing 12 and backbody 40. FIG. 8D shows another view of the pin supporting member 46 with second leg 186 and receiving section 50. The positive stop 31 is shown as an upwardly extending protrusion from a central area of the receiving section 50.

Figure 8E:
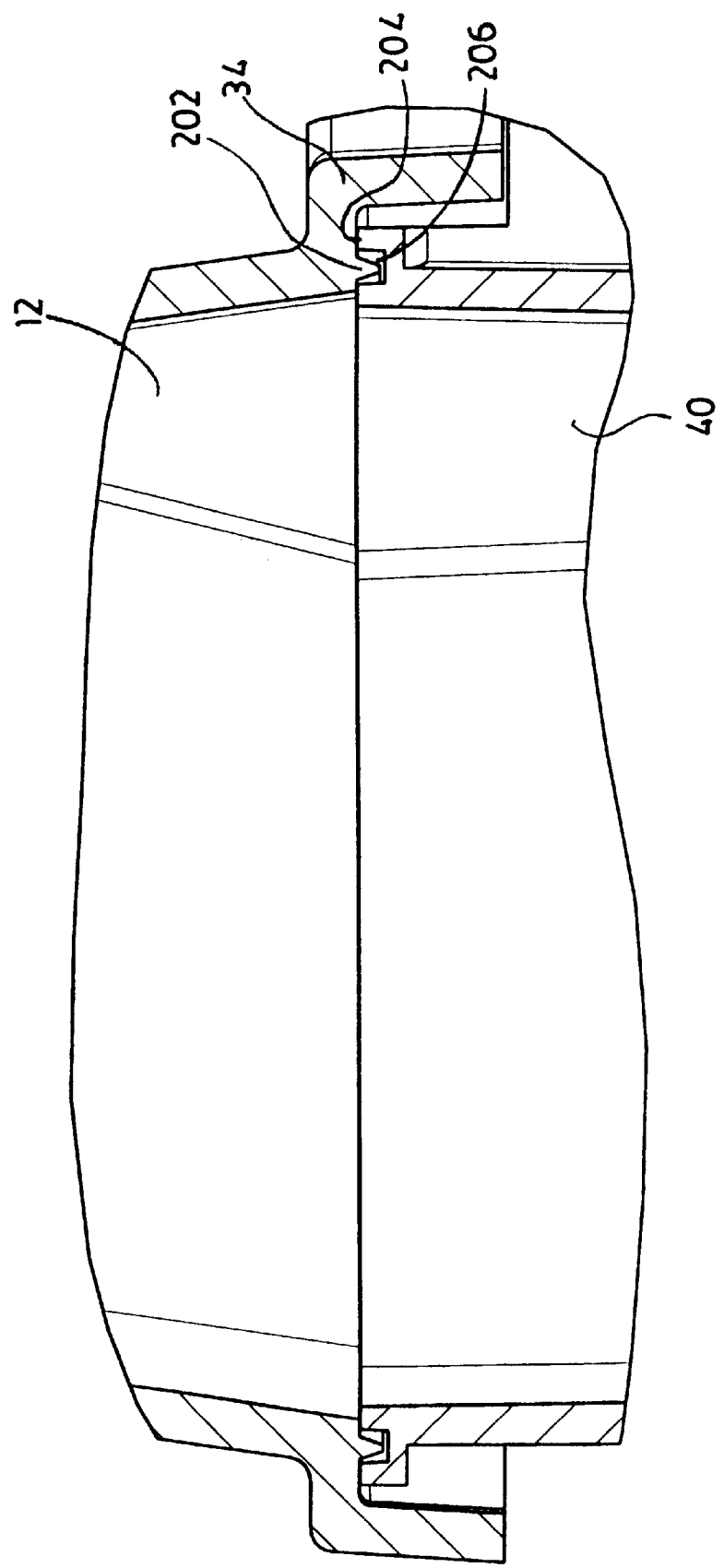
FIG. 8E shows a cross-sectional view of the housing closed upon the back body with a protrusion on the housing inserted in a continuous channel in the rim surface of the back body.
Figure 8F:
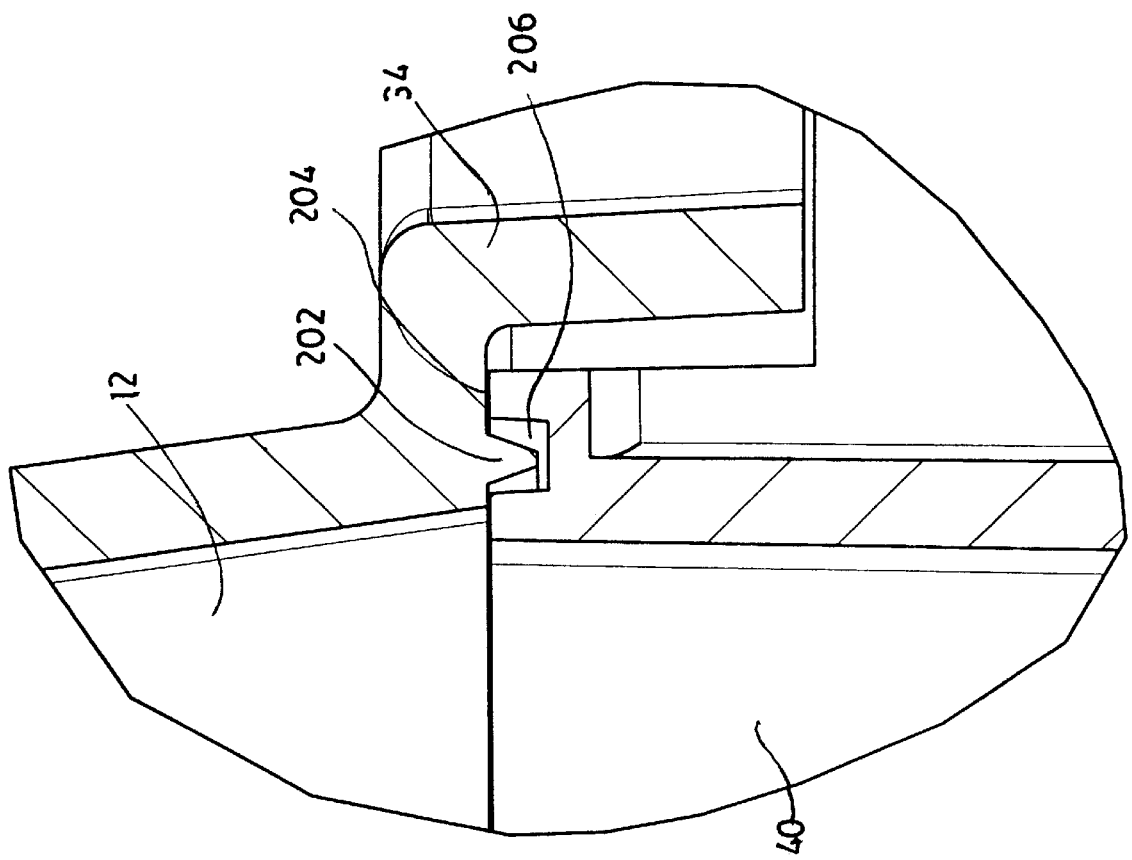
FIG. 8F shows an enlarged view of the protrusion and channel of FIG. 8E.

Turning now to FIGS. 8E–8F, a preferred embodiment of the invention may further include an additional water resistant design which wraps around the product. FIG. 8E shows a channel 206 on the rim surface 204 of the back body 40. The channel 206 follows the rim trajectory. A continuous protrusion 202 inside the mating surface of the housing 12, and within the lip 34, as detailed in FIG. 8F, follows the channel path. Rather than pooling water at the top of the cover 10, this design enables the cover 10 to trap water in the channel 206, directs the water down the sides of the cover, and allows the water to run out of the product due to gravity.

Figure 11:
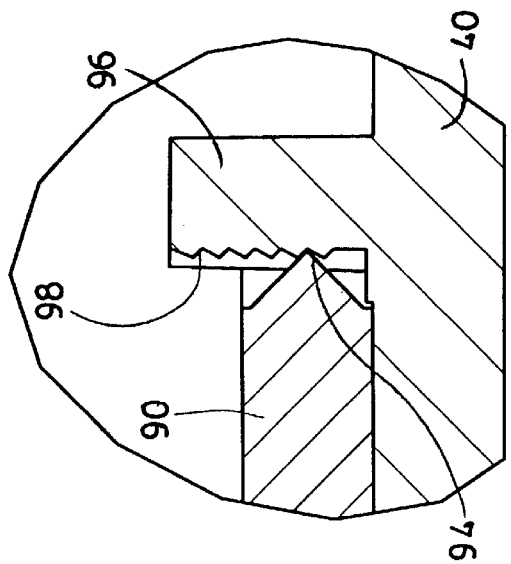
FIG. 11 shows an enlarged view of area 11 in FIG. 10.
Figure 9:
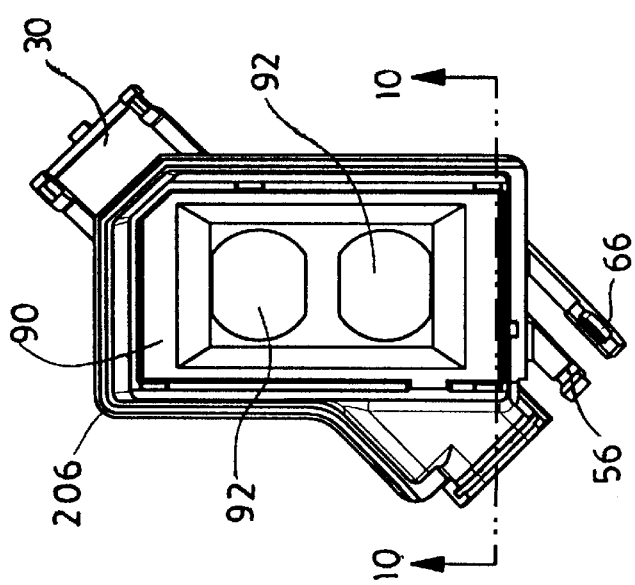
FIG. 9 shows a top plan view of a wall plate installed in the back body of the present invention.
Figure 10:
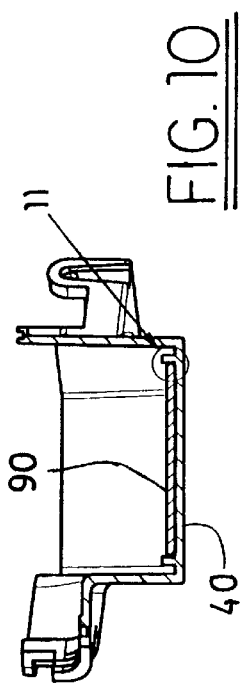
FIG. 10 shows a cross-sectional view taken along line 10—10 in FIG. 9.

The cover 10 of the present invention further preferably includes a pivotal wall plate insertable within the back body 40 for preventing direct access to the box which contains the outlets. Thus, only the outlets with the female receptacles for receiving plugs remain visible. As shown in FIGS. 9–13, a wall plate 90 includes a pair of apertures 92 for allowing access to outlets, not shown. The wall plate 90 further includes an aligning tab 93 for aligning the wall plate 90 correctly within the back body 40 and at least one pawl 94 for securing the wall plate 90 within the back body 40. FIG. 9 further shows a preferred path of the channel 206 which follows the rim surface 204 of most of the sidewalls of the back body 40. As shown in FIGS. 10–12, the back body 40 includes a ridge 97 having an upstanding portion 96 with a plurality of teeth 98. The pawl 94 of the wall plate 90 may engage with the teeth 98 and retain the wall plate 90 securely within the back body 40, without the need for screws. The aligning tab 93 may sit within a recess in the ridge 97 and allows for the easy removal of the wall plate 90.

Figure 13:
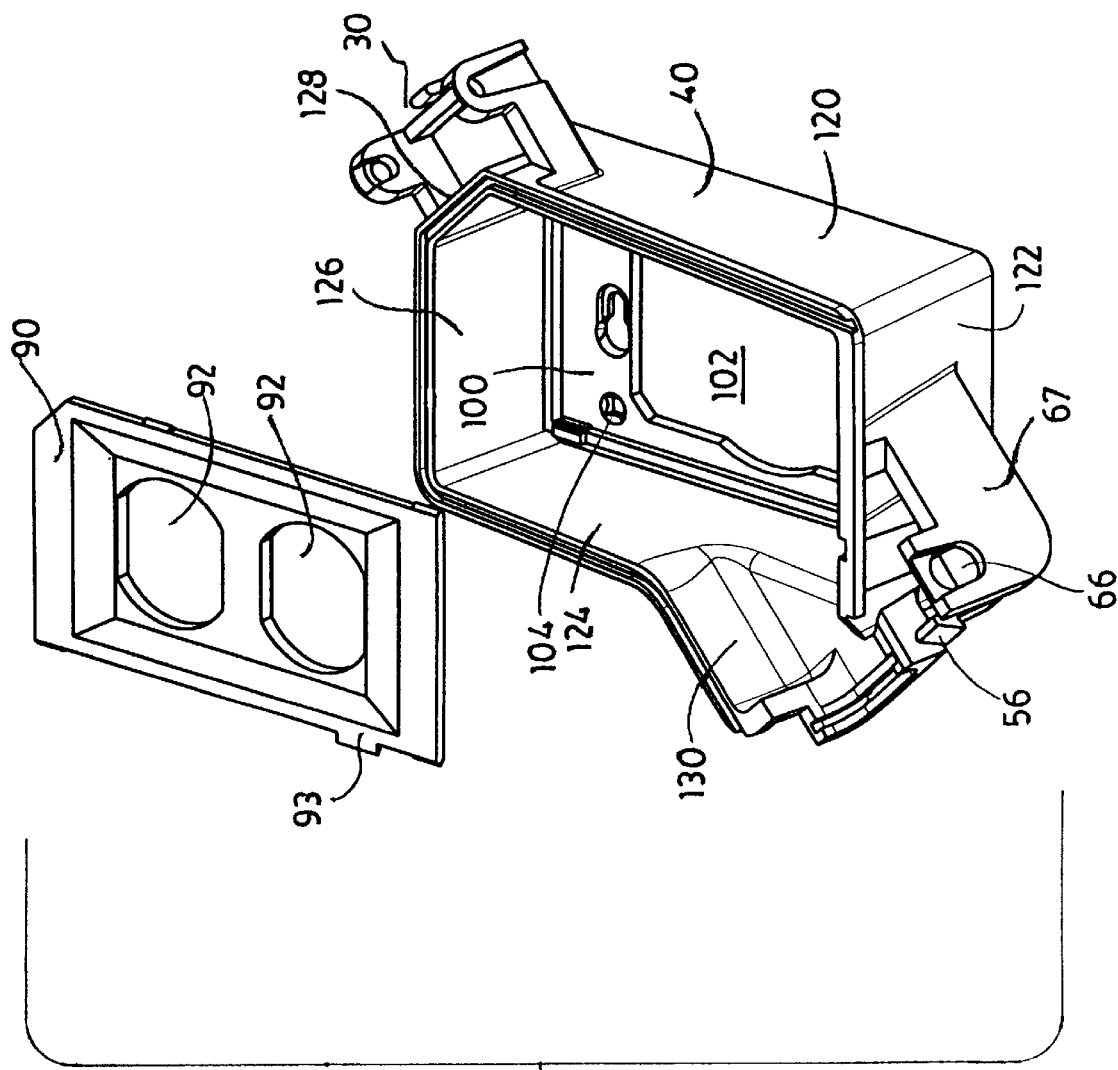
FIG. 13 shows an exploded perspective view of a wall plate and back body of FIG. 9.

As shown in FIG. 13, the back body 40 further includes a rear wall 100 having an opening 102 for accessing the outlets (not shown), and a plurality of openings 104 for securing the back body to the wall surrounding the receptacle. In addition to the rear wall 100, the back body 40 further preferably includes a set of side walls, as previously discussed, which give the back body 40 a generally rectangular shape. The side walls include side walls 120, 122, 124 and 126. The hinge 30 extends between side walls 126 and 120, and may extend from a connecting wall 128. Wall 130 may extend from side wall 124 to lead to exit opening 42. Extending from side wall 122 may be lock hole 66, provided on lock hole extension 67, and latch 56.

Figure 14:
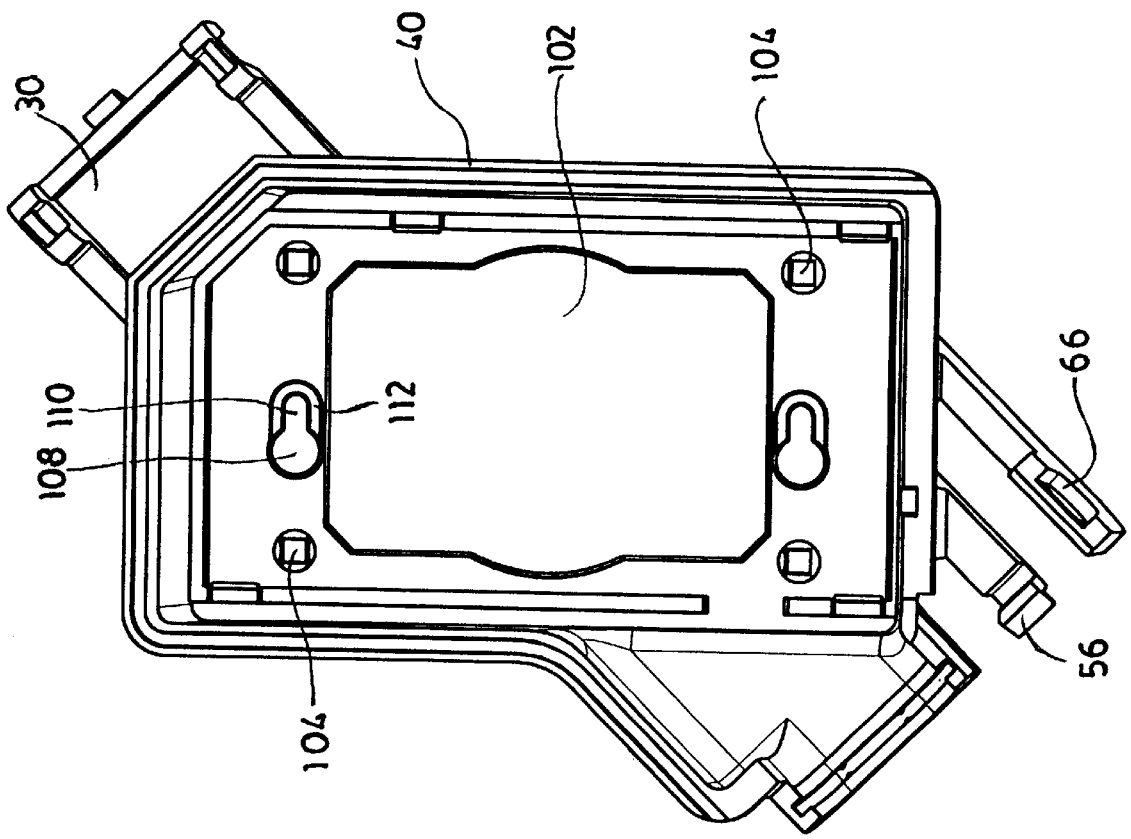
FIG. 14 shows a top plan view of a back body according to a preferred embodiment of the present invention.

In addition to screw holes 104 and aperture 102, the rear wall 100 of the back body 40 is further preferably provided with screw apertures 106, of special design as shown in FIG. 14. The screw aperture 106 allows for an installer of the outlet cover of the present invention to merely back out the existing screws of a duplex receptacle, or the like, rather than completely removing them. Once the screws (not shown) are backed out, the enlarged openings 108 may be placed over the heads of the screws. Once the heads are above the rear wall 100 of the back body 40, the back body 40 may be moved sideways (in FIG. 14, the back body 40 would be moved to the left) such that the shaft of the screw enters the narrow slot 110. Once the shaft of the screw is at the end of the slot 110, the screw can be screwed back into position. The head of the screw may engage recessed area 112 of aperture 106. Thus, the back body 40 can be secured to the receptacle without having to remove, and potentially lose, any existing screws.

Thus, it is apparent that there has been provided, in accordance with the invention, a weatherproof outlet cover that fully satisfies the objects and advantages set forth above. While the invention has been described in conjunction with specific embodiments thereof, it is evident that many alternatives, modifications, and variations will be apparent to those skilled in the art in light of the foregoing description. Accordingly, the present invention is intended to embrace all such alternatives, modifications, and variations as fall within the spirit and broad scope of the appended claims.

What is claimed is:

1. A weatherproof outlet cover assembly comprising:
a back body having a first pair of parallel edges and a second pair of parallel edges, the first pair of parallel edges and a second pair of parallel edges defining lines substantially perpendicular to each other; a housing pivotally connected to the back body; a pivot mount for mounting the housing to the back body, wherein the pivot mount is not parallel to the first pair of parallel edges or the second pair of parallel edges of the back body, and a portion of the pivot mount extends from a corner of the housing.

2. The weatherproof outlet cover assembly of claim 1 wherein the back body is generally rectangular.

3. The weatherproof outlet cover assembly of claim 2 further comprising an exit opening for an electric cord, the exit opening extending from a corner diagonally opposite the corner where the pivot mount extends.

4. The weatherproof outlet cover assembly of claim 3 wherein the exit opening is covered with a pair of rubber flaps which mate when the housing is in a closed position with respect to the back body, each of said pair of rubber flaps having a pair of slits adapted for passing electric cords.

5. The weatherproof outlet cover assembly of claim 1 wherein a first lock hole is provided on the back body and a second lock hole is provided on the housing, wherein the first lock hole and the second lock hole are aligned when the housing is in a closed position.

6. The weatherproof outlet cover assembly of claim 1 further comprising a releasable latch for snapping the housing into a closed position.

7. The weatherproof outlet cover assembly of claim 6 wherein the latch extends from the back body and includes a catch facing the housing.

8. The weatherproof outlet cover assembly of claim 1 wherein the pivot mount includes a pin supporting member extending from the housing, the pin supporting member including a pair of axially aligned pins, and a receiving section extending from the back body, the receiving section including a pair of axially aligned holes for receiving the pins.

9. The weatherproof outlet cover assembly of claim 8 wherein the pin supporting member has a cross-section defining a baffle and the receiving section defines an inner space for receiving the baffle, the baffle adapted to direct water away from mating surfaces of the housing and back body.

10. The weatherproof outlet cover assembly of claim 1 wherein the back body includes an opening, the cover assembly further comprising a wall plate insertable over the opening.

11. The weatherproof outlet cover assembly of claim 10 wherein the wall plate and back body include a snap-on connection.

12. The weatherproof outlet cover assembly of claim 11 wherein the snap-on connection includes a latching pawl and a rack of teeth.

13. The weatherproof outlet cover assembly of claim 12 wherein the latching pawl extends from the wall plate and the rack of teeth is provided on the back body.

14. The weatherproof outlet cover assembly of claim 10 wherein the rear opening is in a rear wall of the back body, the rear wall further including a screw opening, the screw opening including an oversized circular hole through which a head of a screw may pass, and a slot extending from the hole, the slot sized to accept a shaft of the screw, but sized to prevent the screw head from passing through.

15. The weatherproof outlet cover assembly of claim 14 further comprising a recessed area surrounding the slot, the recessed area recessed from a plane defined by the rear wall of the back body.

16. The weatherproof outlet cover assembly of claim 1 further comprising a layer of sealing material behind a rear wall of the back body.

17. The weatherproof outlet cover assembly of claim 1 wherein the back body is limited in size to overlie an electrical outlet in one of a horizontal or vertical orientation.

18. A weatherproof outlet cover assembly comprising:
(a) a box-like housing having a top wall, a set of side walls, and an open rear;
(b) a pivot mount extending from the housing, and
(c) wherein the housing can be mounted using the pivot mount in either a first vertical orientation or a second horizontal orientation, the first and second orientations being orthogonal, wherein the housing is gravity biased to fall into a closed position in both the first orientation and the second orientation.

19. The weatherproof outlet cover assembly of claim 18 further comprising a back body, the pivot mount connecting the back body to the housing.

20. The weatherproof outlet cover assembly of claim 19 wherein each of the back body and the housing comprises a generally rectangular shape, the pivot mount extending from a corner of the housing.

21. The weatherproof outlet cover assembly of claim 20 further comprising an electrical cord exit area located at a corner diagonally opposite the corner from which the pivot mount extends.

22. A weatherproof outlet cover assembly for protecting an electrical receptacle, the cover assembly comprising:
(a) aback body;
(b) a housing pivotally connected to the back body and movable between an open position and a closed position;
(c) an exit opening, formed by the housing and back body when the housing is moved to the closed position;
(d) a first groove, located along an inside edge of the back body;
(e) a second groove, located along an inside edge of the housing;
(f) a first flexible flap inserted in the first groove, the first flexible flap having at least one slit;
(g) a second flexible flap inserted in the second groove, the second flexible flap having at least one slit; and
(h) wherein, when the housing is moved to the closed position, the first and second flexible flaps having mating surfaces and substantially conceal the exit opening, and wherein the at least one slit of the first flexible flap is aligned with the at least one slit of the second flexible flap for allowing an electrical cord to pass.

23. The weatherproof outlet cover assembly of claim 22 wherein each of the first and second grooves comprise teeth for retaining the first and second flexible flaps, respectively, therewithin.

24. The weatherproof outlet cover assembly of claim 22 wherein the first and second flexible flaps are made of rubber and prevent the entry of water through the exit opening.

25. The weatherproof outlet cover assembly of claim 22 wherein the first flexible flap comprises a pair of slits and the second flexible flap comprises a pair of slits.

26. The weatherproof outlet cover assembly of claim 22 wherein the first groove is U-shaped and the second groove is U-shaped, and wherein the first flexible flap and the second flexible flap each have a partial U-shaped periphery to fit within the first and second grooves and a partial straight periphery for defining the mating surface.

27. A weatherproof outlet cover assembly for protecting an electrical receptacle, the cover assembly comprising:
(a) a back body;
(b) a housing pivotally connected to the back body and movable between an open position and a closed position;

(c) a hinge for pivotally connecting the housing to the back body, the hinge comprising (d) a pin supporting member extending from the housing, the pin supporting member including a pair of axially aligned pins;

(e) a receiving section extending from the back body, the receiving section including a pair of axially aligned holes for receiving the pins; and (f) wherein the pin supporting member has a cross-section defining a baffle and the receiving section defines an inner space.

28. The weatherproof outlet cover assembly of claim 27 wherein the baffle comprises a first leg forming an outer portion of the pin supporting member, a second leg spaced apart from the first leg and extending within the inner space, the second leg being longer than the first leg.

29. The weatherproof outlet cover assembly of claim 28 further comprising a stop extending from the receiving section and adapted to prevent the housing from rotating more than 90 degrees in the open position with respect to the back body.

30. The weatherproof outlet cover assembly of claim 29 wherein the stop overlaps with the first leg when the housing is in the closed position.

31. A weatherproof outlet cover assembly for protecting a standard duplex receptacle, the cover assembly comprising:

(a) a back body having a rear wall and a set of sidewalls;

(b) a housing having a top wall and a set of sidewalls, the housing pivotally connected to the back body;

(c) a rear opening in the rear wall of the back body; and (d) a wall plate insertable within the opening, the wall plate having a screw opening, the screw opening including an oversized circular hole through which a head of a screw may pass, and a slot extending from the hole, the slot sized to accept a shaft of the screw but sized to prevent the screw head from passing through.

32. The weatherproof outlet cover assembly of claim 31 wherein the wall plate and back body include a snap-on connection.

33. The weatherproof outlet cover assembly of claim 32 wherein the snap-on connection includes a latching pawl and a rack of teeth.

34. The weatherproof outlet cover assembly of claim 33 wherein the latching pawl extends from the wall plate and the rack of teeth is provided on the back body.

35. The weatherproof outlet cover assembly of claim 34 wherein the rear wall of the back body includes a pair of parallel ridges with a first ridge on one side of the rear opening and a second ridge on an opposite side of the rear opening, the rack of teeth provided in the first ridge.

36. The weatherproof outlet cover assembly of claim 35 wherein the second ridge is interrupted by a space, the wall plate having an aligning tab insertable within the space and usable for removal of the wall plate from the rear wall of the backbody.

37. The weatherproof outlet cover assembly of claim 31 further comprising a recessed area surrounding the slot, the recessed area recessed from a plane defined by the rear wall of the back body.

38. A generally rectangular, or square weatherproof outlet cover assembly comprising: a base; and a cover attached to the base by a hinge arranged diagonally at a corner of the cover assembly.

39. The weatherproof outlet cover assembly of claim 38 further comprising an exit opening for a cord positioned at a diagonally opposite corner of a corner where the hinge is mounted.

40. The weatherproof outlet cover assembly of claim 39 further comprising a generally rectangular back body, the housing hinged to one corner of the back body.

41. The weatherproof outlet cover assembly of claim 40 wherein the back body and housing are sized to protect an electrical outlet.

42. The weatherproof outlet cover assembly of claim 38 wherein the housing is gravity biased to a closed position in either of two orthogonal orientations.

* * * * *